US012750087B2

(12) United States Patent
Hou et al.

(10) Patent No.: US 12,750,087 B2
(45) Date of Patent: Sep. 29, 2026

(54) COMMUNICATION METHOD AND APPARATUS

(71) Applicant: HUAWEI TECHNOLOGIES CO., LTD., Shenzhen (CN)

(72) Inventors: Hailong Hou, Beijing (CN); Zhe Jin, Beijing (CN); Zhihu Luo, Beijing (CN); Weilin Qu, Beijing (CN); Zheng Yu, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 289 days.

(21) Appl. No.: 18/479,647

(22) Filed: Oct. 2, 2023

(65) Prior Publication Data

US 2024/0030964 A1 Jan. 25, 2024

Related U.S. Application Data

(63) Continuation of application No. PCT/CN2022/083206, filed on Mar. 25, 2022.

(30) Foreign Application Priority Data

Apr. 2, 2021 (CN) ......................... 202110359692.9

(51) Int. Cl.
*H04B 1/713* (2011.01)
*H04L 1/08* (2006.01)
(Continued)

(52) U.S. Cl.
CPC ............... *H04B 1/713* (2013.01); *H04L 1/08* (2013.01); *H04L 5/0078* (2013.01); *H04W 72/1268* (2013.01); *H04W 74/0833* (2013.01)

(58) Field of Classification Search
CPC ......... H04B 1/713; H04B 1/7136; H04L 1/08; H04L 5/0078; H04L 1/0025; H04L 1/189;
(Continued)

(56) References Cited

U.S. PATENT DOCUMENTS

2023/0189232 A1* 6/2023 Rastegardoost ...... H04L 5/0012 370/329

FOREIGN PATENT DOCUMENTS

CN 112449419 A 3/2021
WO 2019216818 A1 11/2019
(Continued)

OTHER PUBLICATIONS

Huawei et al., "PUSCH enhancements for URLLC," 3GPP TSG RAN WG1 Meeting #94, R1-1809344, 3rd Generation Partnership Project (3GPP), Mobile Competence Centre; 650, Route Des Lucioles; F-06921 Sophia-Antipolis Cedex; France, Aug. 11, 2018, XP051516708, total 4 pages (Aug. 20-24, 2018).
(Continued)

*Primary Examiner* — Fitwi Y Hailegiorgis
(74) *Attorney, Agent, or Firm* — Leydig, Voit & Mayer, Ltd.

(57) ABSTRACT

This application provides a communication method and apparatus, to improve communication performance of a terminal device. The method includes: determining to perform transmission in a frequency hopping transmission manner; and when transmission is performed in a repeated transmission manner, sending a third message (Msg3) or a message A (MsgA) in a random access procedure in an inter-slot frequency hopping and repeated transmission manner; and/or when transmission is performed in a non-repeated transmission manner, sending the Msg3 or the MsgA in an intra-slot frequency hopping and non-repeated transmission manner.

20 Claims, 6 Drawing Sheets

(51) Int. Cl.
*H04L 5/00* (2006.01)
*H04W 72/1268* (2023.01)
*H04W 74/0833* (2024.01)

(58) Field of Classification Search
CPC ............... H04L 1/1893; H04L 1/0031; H04W 72/1268; H04W 74/0833; H04W 74/004
USPC .......................................................... 375/132
See application file for complete search history.

(56) References Cited

FOREIGN PATENT DOCUMENTS

| | | | |
|---|---|---|---|
| WO | 2020067967 | A1 | 4/2020 |
| WO | 2021031939 | A1 | 2/2021 |

OTHER PUBLICATIONS

Wilus Inc., "Discussion on Type A PUSCH repetitions for Msg3," 3GPP TSG WG1 #104-e, R1-2101683, 3rd Generation Partnership Project (3GPP), Mobile Competence Centre; 650, route des Lucioles; F-06921 Sophia Antipolis Cedex; France, Jan. 19, 2021, XP051971836, total 3 pages (Jan. 25-Feb. 5, 2021).

"3rd Generation Partnership Project; Technical Specification Group Radio Access Network; NR; Physical layer procedures for control (Release 15)," 3GPP TS 38.213 V15.6.0, total 107 pages, 3rd Generation Partnership Project, Valbonne, France (Jun. 2019).

"3rd Generation Partnership Project; Technical Specification Group Radio Access Network; NR; Physical channels and modulation (Release 15)," 3GPP TS 38.211 V15.4.0, total 96 pages 3rd Generation Partnership Project, Valbonne, France (Dec 2018).

* cited by examiner

COMMUNICATION METHOD AND APPARATUS

CROSS-REFERENCE TO RELATED APPLICATIONS

This application is a continuation of International Application No. PCT/CN2022/083206, filed on Mar. 25, 2022, which claims priority to Chinese Patent Application No. 202110359692.9, filed on Apr. 2, 2021. The disclosures of the aforementioned applications are hereby incorporated by reference in their entireties.

TECHNICAL FIELD

This application relates to the field of communication technologies, and in particular, to a communication method and apparatus.

BACKGROUND

In a mobile communication system, a terminal device needs to set up a wireless connection to a network device through a random access procedure, to implement uplink synchronization. With evolution of a communication standard, in addition to supporting a legacy terminal device, the communication standard further supports a terminal device having a lower capability than the legacy terminal device. This type of terminal device may be referred to as a reduced capability (REDCAP) terminal device. A main characteristic of the REDCAP terminal device is that a terminal capability is reduced or limited. For example, a bandwidth capability is limited. Compared with that of the legacy terminal device, a maximum bandwidth is reduced to 20 MHz. For another example, an energy-saving terminal device. Because a bandwidth capability, a capability of a receive antenna or a transmit antenna, or the like of this type of terminal device is low, communication performance between this type of terminal device and the network device is poor. For example, in the random access procedure, the terminal device sends a radio resource control (RRC) connection setup request by using a third message (Msg3) or a message A (MsgA). When the terminal device is located in a cell edge area or a coverage-limited area, performance of Msg3 transmission is poor, and the terminal device may fail to access a network. Therefore, how to improve the communication performance of the terminal device becomes a technical problem that needs to be urgently resolved.

SUMMARY

Embodiments of this application provide a communication method and apparatus, to improve communication performance of a terminal device.

According to a first aspect, a communication method is provided. The method may be performed by a terminal device, or may be performed by a chip or a circuit. The method includes: determining to perform transmission in a frequency hopping transmission manner; and when transmission is performed in a repeated transmission manner, sending first signaling in an inter-slot frequency hopping and repeated transmission manner; and/or when transmission is performed in a non-repeated transmission manner, sending the first signaling in an intra-slot frequency hopping and non-repeated transmission manner.

In this embodiment of this application, repeated transmission is combined with inter-slot frequency hopping, and non-repeated transmission is combined with intra-slot frequency hopping, so that when determining to perform transmission in the repeated transmission manner, the terminal device may receive and send signaling in the inter-slot frequency hopping and repeated transmission manner, to obtain both a frequency hopping gain and a time domain joint channel estimation gain, so as to further improve communication performance. However, when determining to perform transmission in the non-repeated transmission manner, the terminal device may receive and send signaling in the intra-slot frequency hopping and non-repeated transmission manner, to obtain a frequency hopping gain, so as to improve communication performance. In the combinations, the terminal device can obtain a large gain in communication, so that communication performance is greatly improved, and signaling overheads can be reduced.

For example, the first signaling is Msg3. Compared with a current manner in which the Msg3 is sent in the non-repeated transmission manner, this embodiment of this application enables the terminal device to send the Msg3 in the repeated transmission and inter-slot frequency hopping manner, so that a network device can accurately receive the Msg3. In this way, when the terminal device is located in a cell edge area or a coverage-limited area, the terminal device can still set up an RRC connection to the network device, and the terminal device and the network device can communicate with each other through the RRC connection. It should be understood that the Msg3 is merely used as an example for description herein, and the first signaling may alternatively be other uplink signaling. The first signaling is not specifically limited in this application.

In a possible design, whether to perform transmission in the repeated transmission manner may be determined based on first information or a predefined rule. In the foregoing manner, the terminal device and the network device perform transmission in a same transmission manner, so that a communication error caused by inconsistent transmission manners can be avoided.

In a possible design, it is determined, based on second information or a predefined rule, to perform transmission in the frequency hopping transmission manner. In the foregoing manner, the terminal device and the network device perform transmission in a same transmission manner, to avoid a communication error.

In a possible design, the sending first signaling in an inter-slot frequency hopping and repeated transmission manner includes: repeatedly sending the first signaling in an inter-slot frequency hopping manner each time P times of repeated transmission are performed, where P is a positive integer. In the foregoing manner, both a frequency hopping gain and a time-domain joint channel estimation gain can be obtained, to further improve communication performance.

In a possible design, frequency hopping includes inter-BWP frequency hopping and/or intra-BWP frequency hopping.

In a possible design, the sending the first signaling in an intra-slot frequency hopping and non-repeated transmission manner includes: sending the first signaling in an intra-slot frequency hopping and intra-BWP frequency hopping manner. When inter-BWP frequency hopping is performed, the terminal device needs to perform radio frequency retuning (RF retuning), and the terminal device cannot perform sending or receiving during the radio frequency retuning. In the foregoing design, the intra-BWP frequency hopping manner is used when non-repeated transmission is performed, so that transmission performance deterioration caused by inter-BWP frequency hopping can be avoided.

In a possible design, the method further includes: receiving a random access response from the network device, where an uplink grant in the random access response indicates at least one of the following: first information, second information, third information, and fourth information; and the third information indicates a frequency hopping location for inter-BWP frequency hopping, and the fourth information indicates a frequency hopping location for intra-BWP frequency hopping.

In a possible design, an uplink frequency hopping indicator bit included in the uplink grant indicates the third information and/or the fourth information.

In a possible design, the uplink grant indicates at least one of the first information, the second information, the third information, and the fourth information by using one or more of the following: K1 bits in a modulation and coding scheme (MCS) indicator field, where K1 is a positive integer less than or equal to N, and N is a total quantity of bits in the MCS indicator field; and K2 bits in a frequency domain resource allocation (FDRA) indicator field, where K2 is a positive integer less than or equal to M, where, M is a total quantity of bits in the FDRA indicator field. In the foregoing manner, some bits in the uplink grant are re-interpreted, so that the uplink grant may indicate additional information (such as the first information and the second information).

In a possible design, K1 is determined based on a maximum value of an MCS of the first signaling, and the maximum value of the MCS is predefined or is configured by the network device. In the foregoing manner, the maximum value of the MCS of the first signaling is limited, so that the MCS indicator field may have a redundant bit used to indicate additional information (such as the first information and the second information).

In a possible design, K2 is determined based on a maximum quantity of frequency domain resources of the first signaling, and the maximum quantity of frequency domain resources is predefined or is configured by the network device. In the foregoing manner, the maximum quantity of frequency domain resources of the first signaling is limited, so that the FDRA indicator field may have a redundant bit used to indicate additional information (such as the first information and the second information).

In a possible design, the first signaling is a third message (Msg3) in a random access procedure or a message A (MsgA) in the random access procedure.

In a possible design, repeated transmission includes: One transport block occupies one slot in time domain, and performs repeated transmission in a plurality of slots; and non-repeated transmission includes: One transport block occupies one slot in time domain, and performs transmission in one slot.

According to a second aspect, this application provides a communication method. The method may be performed by a terminal device, or may be performed by a chip or a circuit. The method includes: receiving fifth information from a network device, where the fifth information indicates at least one of the following: a maximum value of an MCS of the terminal device, where the maximum value of the MCS is less than a first value, and the first value is a maximum value of the MCS predefined or configured by the network device; and a maximum quantity of frequency domain resources corresponding to transmission performed by the terminal device, where the maximum quantity of frequency domain resources is less than a quantity of frequency domain resources included in a bandwidth part (BWP); and determining sixth information based on the fifth information, where the sixth information includes at least one of the following: a quantity of bits indicating the MCS and a quantity of bits indicating the quantity of frequency domain resources.

In the foregoing manner, the maximum value of the MCS and the maximum quantity of frequency domain resources of the first signaling are limited, so that the MCS indicator field and the FDRA indicator field may have redundant bits used to indicate additional information (such as the first information and the second information).

In a possible design, the determining sixth information includes: determining a quantity of bits in an MCS indicator field and/or a quantity of bits in a frequency domain resource allocation FDRA indicator field, where the quantity of bits in the MCS indicator field is determined based on the maximum value of the MCS of the terminal device, and the quantity of bits in the FDRA indicator field is determined based on the maximum quantity of frequency domain resources. In the foregoing manner, the quantity of bits in the MCS indicator field may be determined based on the maximum value of the MCS of the terminal device, and the quantity of bits in the FDRA indicator field may be determined based on the maximum quantity of frequency domain resources used by the terminal device for transmission.

In a possible design, the determining sixth information includes: determining a quantity of bits that are in the MCS indicator field and that indicate the MCS, and/or a quantity of bits that are in the FDRA indicator field and that indicate the quantity of frequency domain resources. In the foregoing manner, the quantity of bits in the MCS indicator field is predefined or is configured by the network device, and the quantity of bits indicating the MCS may be determined based on the maximum value of the MCS of the terminal device. The quantity of bits in the FDRA indicator field is predefined or is configured by the network device, and the quantity of bits indicating the quantity of frequency domain resources may be determined based on a maximum quantity of frequency domain resources of transmission performed by the terminal device.

In a possible design, the quantity of bits indicating the MCS is determined based on the maximum MCS value of the terminal device.

For example, the quantity of bits indicating the MCS meets the following formula:

$$k1 = \lceil \log_2(X+1) \rceil$$

Herein, k1 is the quantity of bits indicating the MCS, and X is the maximum value of the MCS of the terminal device.

Currently, for example, a total quantity of bits in the MCS indicator field is 4, and the first value is 9. Therefore, if the maximum value of the MCS of the terminal device is equal to 9, 4 bits are required for indicating the MCS. In other words, all bits in the MCS indicator field indicate the MCS. In this embodiment of this application, the maximum value of the MCS of the terminal device is limited to be less than 9, so that a quantity of bits required for indicating the MCS is reduced, and the MCS indicator field may indicate other information by using a redundant bit. For example, if the maximum value of the MCS of the terminal device is 7, $$\lceil \log_2(7+1) \rceil = 3 \text{ bits}$$

are required for indicating the MCS. Therefore, in the MCS indicator field, 3 bits may indicate the MCS, and the remaining one bit is used as a re-interpreted bit to indicate other information.

In a possible design, the quantity of bits indicating the quantity of frequency domain resources is determined based on the maximum quantity of frequency domain resources corresponding to transmission performed by the terminal device.

For example, the quantity of bits indicating the quantity of frequency domain resources meets the following formula:

$$k2 = \left\lceil \log_2(Y(N_{BWP}^{size} - Y) + \frac{Y(Y+1)}{2} \right\rceil$$

Herein, k2 is the quantity of bits indicating the quantity of frequency domain resources, $$N_{BWP}^{size}$$

is the quantity or frequency domain resources included in the BWP, and Y is the maximum quantity of frequency domain resources.

Currently, for example, the total quantity of bits in the FDRA indicator field is 14, and $$N_{BWP}^{size} = 273.$$

Therefore, the maximum quantity of frequency domain resources corresponding to transmission performed by the terminal device is equal to 273. In this case, all bits in the FDRA indicator field indicate frequency domain resource information. In this embodiment of this application, the maximum quantity of frequency domain resources corresponding to transmission performed by the terminal device is limited to be less than 273, so that a quantity of bits required for indicating the quantity of frequency domain resources is reduced, and the FDRA indicator field may indicate other information by using a redundant bit. For example, if the maximum quantity of frequency domain resources corresponding to transmission performed by the terminal device is 31, and $$N_{BWP}^{size} = 273, \left\lceil \log_2\left(Y(N_{BWP}^{size} - Y) + \frac{Y(Y+1)}{2}\right\rceil = 13 \text{ bits}$$

bits are required for indicating the MCS. Therefore, in the FDRA indicator field, 13 bits may indicate the frequency domain resource allocation information, and the remaining one bit is used as a re-interpreted bit to indicate other information.

According to a third aspect, this application provides a communication method. The method may be performed by a network device, or may be performed by a chip or a circuit. The method includes: determining to perform transmission in a frequency hopping transmission manner; and when transmission is performed in a repeated transmission manner, receiving (or sending) first signaling in an inter-slot frequency hopping and repeated transmission manner; and/or when transmission is performed in a non-repeated transmission manner, receiving (or sending) the first signaling in an intra-slot frequency hopping and non-repeated transmission manner.

In this embodiment of this application, repeated transmission and inter-slot frequency hopping are combined, and non-repeated transmission and intra-slot frequency hopping are combined, so that when determining to perform transmission in the repeated transmission manner, the network device may receive and send signaling in the inter-slot frequency hopping and repeated transmission manner, and when determining to perform transmission in the non-repeated transmission manner, the network device may receive and send signaling in the intra-slot frequency hopping and non-repeated transmission manner, to improve a frequency hopping gain and transmission performance of the first signaling.

In a possible design, whether to perform transmission in the repeated transmission manner may be determined based on a predefined rule. In the foregoing manner, a terminal device and the network device perform transmission in a same transmission manner, to avoid a communication error.

In a possible design, it may be determined, based on a predefined rule, to perform transmission in the frequency hopping transmission manner. In the foregoing manner, the terminal device and the network device perform transmission in a same transmission manner, to avoid a communication error.

In a possible design, transmitting first signaling in an inter-slot frequency hopping and repeated transmission manner includes: repeatedly transmitting the first signaling in an inter-slot frequency hopping manner each time P times of repeated transmission are performed, where P is a positive integer. In the foregoing manner, both a frequency hopping gain and a time-domain joint channel estimation gain can be obtained, to further improve communication performance.

In a possible design, frequency hopping includes inter-BWP frequency hopping and/or intra-BWP frequency hopping.

In a possible design, transmitting the first signaling in an intra-slot frequency hopping and non-repeated transmission manner includes: transmitting the first signaling in an intra-slot frequency hopping and intra-BWP frequency hopping manner. When inter-BWP frequency hopping is performed, the terminal device needs to perform radio frequency retuning (RF retuning), and the terminal device cannot perform sending or receiving during the radio frequency retuning. In the foregoing design, the intra-BWP frequency hopping manner is used when non-repeated transmission is performed, so that transmission performance deterioration caused by inter-BWP frequency hopping can be avoided.

In a possible design, the method further includes: sending a random access response, where an uplink grant in the random access response indicates at least one of the following: first information, second information, third information, and fourth information; and the first information indicates whether to perform transmission in the repeated transmission manner, the second information indicates to perform transmission in the frequency hopping transmission manner, the third information indicates a frequency hopping location for inter-BWP frequency hopping, and the fourth information indicates a frequency hopping location for intra-BWP frequency hopping.

In a possible design, an uplink frequency hopping indicator bit included in the uplink grant indicates the third information and/or the fourth information.

In a possible design, the uplink grant indicates at least one of the first information, the second information, the third information, and the fourth information by using one or more of the following: K1 bits in a modulation and coding scheme (MCS) indicator field, where K1 is a positive integer less than or equal to N, and N is a total quantity of bits in the MCS indicator field; and K2 bits in a frequency domain resource allocation (FDRA) indicator field, where K2 is a positive integer less than or equal to M, where, M is a total quantity of bits in the FDRA indicator field. In the foregoing manner, some bits in the uplink grant are re-interpreted, so that the uplink grant may indicate additional information (such as the first information and the second information).

In a possible design, K1 is determined based on a maximum value of an MCS of the first signaling, and the maximum value of the MCS is predefined or is configured by the network device. In the foregoing manner, the maximum value of the MCS of the first signaling is limited, so that the MCS indicator field may have a redundant bit used to indicate additional information (such as the first information and the second information).

In a possible design, K2 is determined based on a maximum quantity of frequency domain resources of the first signaling, and the maximum quantity of frequency domain resources is predefined or is configured by the network device. In the foregoing manner, the maximum quantity of frequency domain resources of the first signaling is limited, so that the FDRA indicator field may have a redundant bit used to indicate additional information (such as the first information and the second information).

In a possible design, the first signaling is a third message (Msg3) in a random access procedure or a message A (MsgA) in the random access procedure.

In a possible design, repeated transmission includes: One transport block occupies one slot in time domain, and performs repeated transmission in a plurality of slots; and non-repeated transmission includes: One transport block occupies one slot in time domain, and performs transmission in one slot.

According to a fourth aspect, this application provides a communication method. The method may be performed by a network device, or may be performed by a chip or a circuit. The method includes: determining fifth information, where the fifth information indicates at least one of the following: a maximum value of an MCS of a terminal device, where the maximum value of the MCS is less than a first value, and the first value is a maximum value of an MCS predefined or configured by the network device; and a maximum quantity of frequency domain resources corresponding to transmission performed by the terminal device, where the maximum quantity of frequency domain resources is less than a quantity of frequency domain resources included in a BWP; and sending the fifth information.

In the foregoing manner, the maximum value of the MCS and the maximum quantity of frequency domain resources of the first signaling are limited, so that the MCS indicator field and the FDRA indicator field may have redundant bits used to indicate additional information (such as the first information and the second information).

According to a fifth aspect, this application further provides a communication apparatus. The communication apparatus can implement any method provided in the first aspect or the second aspect. The communication apparatus may be implemented by hardware, or may be implemented by executing corresponding software by hardware. The hardware or the software includes one or more units or modules corresponding to the foregoing function.

In a possible implementation, the communication apparatus includes a processor. The processor is configured to support the communication apparatus in performing a corresponding function of a terminal device in the foregoing method. The communication apparatus may further include a memory. The memory may be coupled to the processor, and the memory stores program instructions and data that are necessary for the communication apparatus. Optionally, the communication apparatus further includes an interface circuit. The interface circuit is configured to support communication between the communication apparatus and a device such as a network device.

In a possible implementation, the communication apparatus includes corresponding functional modules, configured to implement the steps in the foregoing method. The function may be implemented by hardware, or may be implemented by executing corresponding software by hardware. The hardware or software includes one or more modules corresponding to the foregoing function.

In a possible implementation, a structure of the communication apparatus includes a processing unit and a communication unit. These units may perform corresponding functions in the foregoing method example. For details, refer to the descriptions in the method provided in the first aspect or the second aspect. Details are not described herein again.

According to a sixth aspect, this application further provides a communication apparatus. The communication apparatus can implement any method provided in the third aspect or the fourth aspect. The communication apparatus may be implemented by hardware, or may be implemented by executing corresponding software by hardware. The hardware or the software includes one or more units or modules corresponding to the foregoing function.

In a possible implementation, the communication apparatus includes a processor. The processor is configured to support the communication apparatus in performing a corresponding function of a network device in the foregoing method. The communication apparatus may further include a memory. The memory may be coupled to the processor, and the memory stores program instructions and data that are necessary for the communication apparatus. Optionally, the communication apparatus further includes an interface circuit. The interface circuit is configured to support communication between the communication apparatus and a device such as a terminal device.

In a possible implementation, the communication apparatus includes corresponding functional modules, configured to implement the steps in the foregoing method. The function may be implemented by hardware, or may be implemented by executing corresponding software by hardware. The hardware or software includes one or more modules corresponding to the foregoing function.

In a possible implementation, a structure of the communication apparatus includes a processing unit and a communication unit. These units may perform corresponding functions in the foregoing method example. For details, refer to the descriptions in the method provided in the third aspect or the fourth aspect. Details are not described herein again.

According to a seventh aspect, a communication apparatus is provided. The communication apparatus includes a processor and an interface circuit. The interface circuit is configured to: receive a signal from another communication apparatus other than the communication apparatus and transmit the signal to the processor, or send a signal from the processor to another communication apparatus other than the communication apparatus. The processor is configured to implement the method in any one of the first aspect or the second aspect and the possible designs by using a logic circuit or executing code instructions.

According to an eighth aspect, a communication apparatus is provided. The communication apparatus includes a processor and an interface circuit. The interface circuit is configured to: receive a signal from another communication apparatus other than the communication apparatus and transmit the signal to the processor, or send a signal from the processor to another communication apparatus other than the communication apparatus. The processor is configured to implement a functional module of the method in any one of the third aspect or the fourth aspect and the possible designs by using a logic circuit or executing code instructions.

According to a ninth aspect, a computer-readable storage medium is provided. The computer-readable storage medium stores a computer program or instructions. When the computer program or the instructions is/are executed by a processor, the method in any one of the first aspect to the fourth aspect and the possible designs of the first aspect to the fourth aspect is implemented.

According to a tenth aspect, a computer program product storing instructions is provided. When the instructions are run by a processor, the method in any one of the first aspect to the fourth aspect and the possible designs of the first aspect to the fourth aspect is implemented.

According to an eleventh aspect, a chip system is provided. The chip system includes a processor, may further include a memory, and is configured to implement the method in any one of the first aspect to the fourth aspect and the possible designs of the first aspect to the fourth aspect. The chip system may include a chip, or may include a chip and another discrete component.

According to a twelfth aspect, a communication system is provided. The system includes the apparatus (for example, a terminal device) in the first aspect and the apparatus (for example, a network device) in the third aspect.

According to a thirteenth aspect, a communication system is provided. The system includes the apparatus (for example, a terminal device) in the second aspect and the apparatus (for example, a network device) in the fourth aspect.

DESCRIPTION OF EMBODIMENTS

Figure 1:
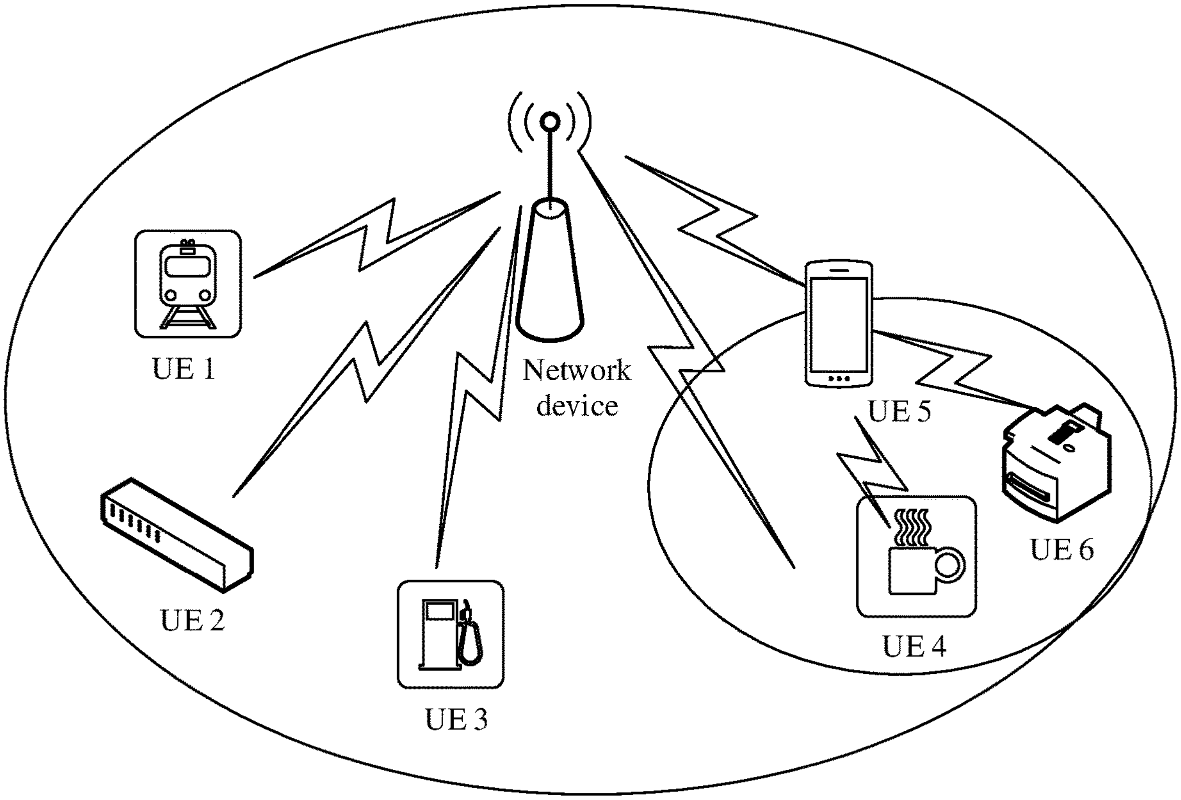
FIG. 1 is a schematic diagram of an architecture of a network system according to an embodiment of this application.

To make objectives, technical solution, and advantages of embodiments of this application clearer, the following further describes embodiments of this application in detail with reference to accompanying drawings.

The following describes some terms in embodiments of this application, to facilitate understanding of a person skilled in the art.

1. The terminal device may be a device having a wireless transceiver function or a chip that can be disposed in any device, or may be referred to as user equipment (UE), an access terminal, a subscriber unit, a subscriber station, a mobile station, a mobile console, a mobile station, a remote station, a remote terminal, a mobile device, a user terminal, a wireless communication device, a user agent, or a user apparatus. The terminal device in embodiments of this application may be a mobile phone, a tablet computer (Pad), a computer with a wireless transceiver function, a virtual reality (VR) terminal, an augmented reality (AR) terminal, a wireless terminal in industrial control, a wireless terminal in self driving, or the like.

The network device may be an apparatus configured to implement a function of an access network device. The access network device may be a device that communicates with a wireless terminal device over an air interface in an access network by using one or more cells. For example, the access network device may be a next generation NodeB (gNB) in an NR system, an evolved NodeB (eNB) in an LTE system, or the like. Alternatively, the network device may be an apparatus that can support the network device in implementing a function of the access network device, for example, a chip system. The apparatus may be mounted in the network device.

2. The terminal device in embodiments of this application may be a first-type terminal device, a second-type terminal device, or another terminal device that needs to perform transmission performance enhancement, for example, an NR enhanced mobile broadband (eMBB) terminal device. A difference between the first-type terminal device and the second-type terminal device includes at least one of the following:

1. Bandwidth capabilities are different. A maximum bandwidth supported by the first-type terminal device may be greater than a maximum bandwidth supported by the second-type terminal device. For example, the first-type terminal device may support a maximum of 100 MHz frequency domain resources on one carrier to communicate with the network device, and the second-type terminal device may support a maximum of 20 MHz, 10 MHz, or 5 MHz frequency domain resources on one carrier to communicate with the network device.
2. Quantities of transceiver antennas are different. An antenna configuration of the first-type terminal device may be greater than an antenna configuration of the second-type terminal device. For example, a minimum antenna configuration supported by the first-type terminal device may be greater than a maximum antenna configuration supported by the second-type terminal device.
3. Maximum uplink transmit power is different. Maximum uplink transmit power of the first-type terminal device may be greater than maximum uplink transmit power of the second-type terminal device.
4. The first-type terminal device and the second-type terminal device correspond to different protocol versions. For example, NR Rel-15 and NR Rel-16 terminal devices may be considered as first-type terminal devices, and the second-type terminal device may be considered as an NR Rel-17 terminal device.

5. The first-type terminal device and the second-type terminal device support different carrier aggregation (CA) capabilities. For example, the first-type terminal device may support carrier aggregation, but the second-type terminal device does not support carrier aggregation. For another example, both the second-type terminal device and the first-type terminal device support carrier aggregation, but a maximum quantity of carriers that can be simultaneously aggregated by the first-type terminal device is greater than a maximum quantity of carriers that can be simultaneously aggregated by the second-type terminal device.
6. Frequency division duplex (FDD) capabilities of the first-type terminal device and the second-type terminal device are different. For example, the first-type terminal device may support full-duplex FDD, and the second-type terminal device may support only half-duplex FDD.
7. The second-type terminal device and the first-type terminal device have different data processing time capabilities. For example, a minimum delay between receiving downlink data and sending feedback on the downlink data by the first-type terminal device is less than a minimum delay between receiving the downlink data and sending feedback on the downlink data by the second-type terminal device.
8. The first-type terminal device and the second-type terminal device correspond to different uplink and/or downlink peak transmission rates.

In embodiments of this application, "at least one" means one or more, and "a plurality of" means two or more. "And/or" describes an association relationship between associated objects, and indicates that three relationships may exist. For example, A and/or B may indicate the following cases: Only A exists, both A and B exist, and only B exists, where A and B may be singular or plural. A character "/" generally indicates an "or" relationship between the associated objects. At least one of the following items (pieces) or a similar expression thereof refers to any combination of these items, including any combination of singular items (pieces) or plural items (pieces). For example, at least one of a, b, or c may indicate: a, b, c, a-b, a-c, b-c, or a-b-c, where a, b, and c may be singular or plural.

In addition, unless otherwise stated, ordinal numbers such as "first" and "second" in embodiments of this application are used to distinguish between a plurality of objects, and are not intended to limit sizes, content, an order, a time sequence, priorities, or importance degrees of the plurality of objects. For example, first information and second information are merely used to distinguish between different information, and do not indicate different sizes, content, priorities, importance, or the like of the two types of information.

The foregoing describes some terms in embodiments of this application. The following describes technical features in embodiments of this application.

A random access procedure includes a 4-step random access channel (RACH) and a 2-step RACH. In the 4-step RACH, after receiving a random access preamble sent by the terminal device, the network device sends a random access response (RAR) to the terminal device. The random access response (RAR) includes information such as uplink resource allocation information. The terminal device sends a third message (Msg 3) in the random access procedure based on scheduling of the RAR message, where Msg3 is used to send an RRC connection setup request. In the 2-step RACH, the terminal device sends a message A (MsgA) to the network device. The MsgA includes two parts: one part is a preamble, and the other part is a physical uplink shared channel (PUSCH) payload. It may be considered that the MsgA message includes the preamble and content included in the Msg3 in the 4-step RACH.

Currently, in an initial access phase, the network device configures a common BWP of a cell for the terminal device to perform random access, and the BWP includes an initial downlink BWP (initial DL BWP) and an initial uplink BWP (initial UL BWP). Some uplink channel transmission parameters in the random access procedure are configured in the initial uplink BWP, and the parameters includes a physical random access channel (PRACH) resource of a first message (Msg1), a physical uplink shared channel (PUSCH) resource of a third message (Msg3), a common PUCCH resource used for hybrid automatic repeat request (HARQ)-acknowledgment (ACK) feedback of a fourth message (Msg4), and the like.

A bandwidth capability of the second-type terminal device is small and another terminal capability is reduced, and consequently, communication performance between the second-type terminal device and the network device is poor. For example, performance of Msg3 transmission is poor, and the second-type terminal device cannot access a network.

Based on this, embodiments of this application provide a communication method and apparatus, to resolve a problem that communication performance deteriorates due to bandwidth reduction and/or antenna reduction and another terminal capability reduction. The method and the apparatus are based on a same concept. Because principles for resolving a problem by using the method and the apparatus are similar, mutual reference may be made between implementations of the apparatus and the method, and repeated descriptions are omitted.

The communication method provided in this application may be applied to various communication systems, for example, internet of things (IoT), narrow band internet of things (NB-IoT), long term evolution (LTE), a 5th generation (5G) communication system, an LTE and 5G hybrid architecture, a 5G new radio (NR) system, and a 6G system or a new communication system emerging in future communication development. The 5G communication system described in this application may include at least one of a non-standalone (NSA) 5G communication system and a standalone (SA) 5G communication system. The communication system may alternatively be a machine to machine (M2M) network or another network.

FIG. 1 shows a communication system according to an embodiment of this application. The communication system includes a network device and six terminal devices, namely, UE 1 to UE 6. In the communication system, the UE 1 to the UE 6 may send uplink data to the network device, and the network device may receive the uplink data sent by the UE 1 to the UE 6. In addition, UE 4 to the UE 6 may also constitute a communication subsystem. The network device may send downlink information to the UE 1, UE 2, UE 3, and UE 5, and the UE 5 may send the downlink information to the UE 4 and the UE 6 based on a device-to-device (D2D) technology. FIG. 1 is merely a schematic diagram, and a type of a communication system, a quantity of devices included in the communication system, a type of a device included in the communication system, and the like are not specifically limited.

Figure 2:
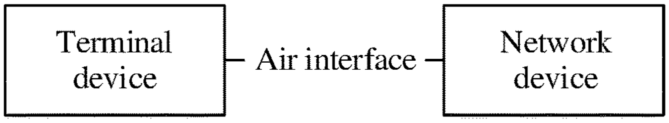
FIG. 2 is a schematic diagram of a connection between a terminal device and a network device according to an embodiment of this application.

For example, the network device and the terminal device may be connected through an air interface. For example, a connection relationship between the network device and the terminal device may be shown in FIG. 2.

A network architecture and a service scenario described in embodiments of this application are intended to describe the technical solutions in embodiments of this application more clearly, and do not constitute a limitation on the technical solutions provided in embodiments of this application. A person of ordinary skill in the art may know that: With the evolution of the network architecture and the emergence of new service scenarios, the technical solutions provided in embodiments of this application are also applicable to similar technical problems.

The following describes the technical solutions in embodiments of this application with reference to the accompanying drawings in embodiments of this application. For ease of description, in the following, an example in which the method is performed by a network device and a terminal device is used.

In embodiments of this application, "transmission" may be understood as sending and/or receiving. For ease of understanding of the solutions, the following describes the communication method in this application by using an example in which transmission on a terminal device side means sending, and transmission on a network device side means receiving, in other words, the terminal device sends first signaling and the network device receives the first signaling.

Figure 3:
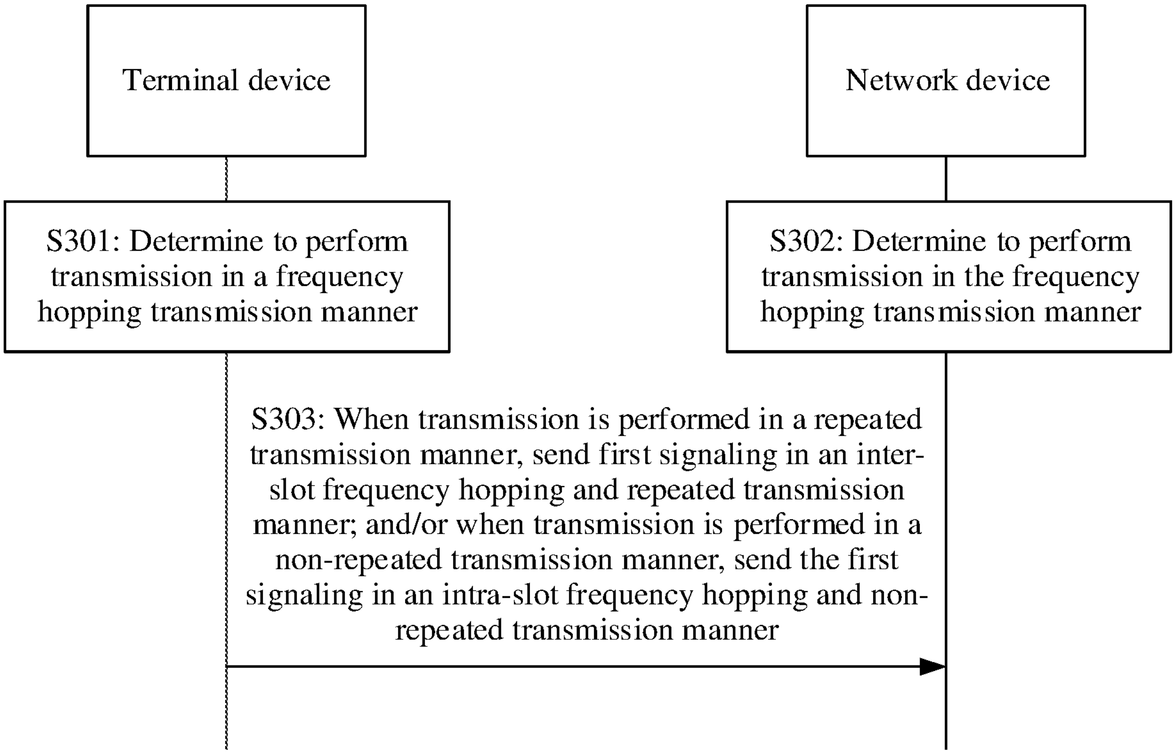
FIG. 3 is a schematic flowchart of a communication method according to an embodiment of this application.

FIG. 3 is a schematic flowchart of a communication method in this application. The method includes the following steps.

S301: A terminal device determines to perform transmission in a frequency hopping transmission manner.

S302: A network device determines to perform transmission in the frequency hopping transmission manner.

In other words, the terminal device and the network device may determine to send and/or receive information in the frequency hopping manner in a next time period, or determine to send and/or receive several pieces of information in the frequency hopping manner. S301 and S302 are optional steps. A sequence of S301 and S302 is not limited in this embodiment of this application.

S303: When transmission is performed in a repeated transmission manner, the terminal device sends first signaling in an inter-slot frequency hopping and repeated transmission manner; and/or when transmission is performed in a non-repeated transmission manner, sends the first signaling in an intra-slot frequency hopping and non-repeated transmission manner.

Correspondingly, the terminal device sends the first signaling in the inter-slot frequency hopping and repeated transmission manner, and the network device receives the first signaling in the inter-slot frequency hopping and repeated transmission manner. The terminal device sends the first signaling in the intra-slot frequency hopping and non-repeated transmission manner, and the network device receives the first signaling in the intra-slot frequency hopping and non-repeated transmission manner. For example, the first signaling may be signaling such as the Msg3 or the MsgA.

It should be understood that the communication method in this embodiment of this application is not only applicable to Msg3 transmission, but also applicable to another transmission scenario of a physical downlink shared channel (PDSCH), a physical uplink shared channel (PUSCH), a physical downlink control channel (PDCCH), a physical uplink shared channel (PUSCH), a physical random access channel (PRACH), a physical uplink shared channel (PUSCH), or a reference signal (RS), for example, a channel state information reference signal (CSI-RS) or a sounding reference signal (SRS).

Optionally, the terminal device may send or receive information, data, or the like by using the communication method in this embodiment of this application.

It should be noted that, the communication method in this embodiment of this application is also applicable to downlink transmission.

The frequency hopping manner and the repeated manner include at least one of the following: non-frequency hopping and non-repeated transmission, non-frequency hopping and repeated transmission, inter-slot frequency hopping and repeated transmission, inter-slot frequency hopping and non-repeated transmission, intra-slot frequency hopping and non-repeated transmission, and intra-slot frequency hopping and repeated transmission. In other words, in addition to the two transmission types: inter-slot frequency hopping and repeated transmission and intra-slot frequency hopping and non-repeated transmission, the terminal device and the network device may further receive and send the first signaling by using the other four transmission types.

The terminal device and the network device may support one or more of the six transmission types.

For example, the terminal device and the network device may support inter-slot frequency hopping and repeated transmission and non-frequency hopping and non-repeated transmission, and determine, based on predefined information or information configured by the network device, to perform inter-slot frequency hopping and repeated transmission or non-frequency hopping and non-repeated transmission.

For another example, the terminal device and the network device may receive and send the first signaling in the inter-slot frequency hopping and non-repeated transmission manner. In this mode, codewords of one transport block (TB) are mapped to a plurality of slots. For another example, the terminal device and the network device may perform intra-slot frequency hopping and repeated transmission.

For another example, the terminal device and the network device may receive and send the first signaling in the non-frequency hopping and non-repeated transmission manner.

For another example, the terminal device and the network device may receive and send the first signaling in the non-frequency hopping and repeated transmission manner. In this mode, repeated transmission of the first signaling may be performed in an inter-slot or intra-slot manner.

In an implementation, the terminal device may determine, based on first information from the network device, whether to perform sending in the repeated transmission manner. Alternatively, the terminal device may determine, based on a predefined rule, whether to perform sending in the repeated transmission manner. The network device may determine, based on the predefined rule, whether to perform receiving in the repeated transmission manner. The predefined rule may be that a protocol specifies whether to perform repeated transmission, or that a protocol specifies a scenario in which repeated transmission is performed or signaling used for repeated transmission, and/or a scenario in which non-repeated transmission is performed or signaling used for non-repeated transmission, or the like. Specifically, the first information may indicate a quantity of times of repeated transmission, and indicate, based on the quantity of times of repeated transmission, whether to perform repeated transmission. For example, if the quantity of times of repeated transmission is 1, it indicates that transmission is performed only once, and repeated transmission does not need to be performed. If the quantity of times of repeated transmission is greater than 1, it indicates that transmission is repeatedly performed for the quantity of times. For another example, the first information being 0 may indicate that repeated transmission is not performed.

In an implementation, the terminal device may determine, based on second information from the network device, to perform sending in the frequency hopping transmission manner, or may determine, based on a predefined rule, to perform sending in the frequency hopping transmission manner. The network device may determine, based on the predefined rule, to perform receiving in the frequency hopping transmission manner. For example, the predefined rule may be that a protocol specifies whether to perform frequency hopping, or that a protocol specifies a scenario in which frequency hopping is performed or signaling used for frequency hopping, and/or a scenario in which non-frequency hopping is performed or signaling used for non-frequency hopping, or the like.

It should be noted that, a sequence of a process in which the terminal device (or the network device) determines whether to perform sending in the repeated transmission manner and a process in which the terminal device (or the network device) determines whether to perform sending in the frequency hopping transmission manner is not limited in this embodiment of this application.

In an example description, for single slot transmission, non-repeated transmission means that a codeword of a transport block (TB) is mapped to a time-frequency resource in a slot; and repeated transmission means that a codeword of a TB is mapped to a time-frequency resource in a slot, and repeated mapping is performed in a plurality of slots. Transmitting a TB in a plurality of slots means that a codeword of the TB is mapped to time-frequency resources in the plurality of slots. It may be understood that transmitting the TB is in the plurality of slots does not belong to repeated transmission.

In this embodiment of this application, repeated transmission is combined with inter-slot frequency hopping, and non-repeated transmission is combined with intra-slot frequency hopping, so that when determining to perform transmission in the repeated transmission manner, the terminal device may receive and send signaling in the inter-slot frequency hopping and repeated transmission manner, to obtain both a frequency hopping gain and a time domain joint channel estimation gain, so as to further improve communication performance. However, when determining to perform transmission in the non-repeated transmission manner, the terminal device may receive and send signaling in the intra-slot frequency hopping and non-repeated transmission manner, to obtain a frequency hopping gain, so as to improve communication performance. In the combinations, the terminal device can obtain a large gain in communication, so that communication performance is greatly improved, and signaling overheads can be reduced.

For example, for a second-type terminal device with a small bandwidth capability, when the terminal device works in a large bandwidth, the terminal device may perform communication at different frequencies in the frequency hopping manner based on different service features, to improve communication efficiency. In addition, when the bandwidth capability is limited, transmission performance may be enhanced through retransmission.

For example, the first signaling is Msg3. Compared with a current manner in which the Msg3 is sent in the non-repeated transmission manner, this embodiment of this application enables the terminal device to send the Msg3 in the repeated transmission and inter-slot frequency hopping manner, so that the network device can accurately receive the Msg3. In this way, when the terminal device is located in a cell edge area or a coverage-limited area, the terminal device can still set up an RRC connection to the network device, and the terminal device and the network device can communicate with each other through the RRC connection.

In a possible implementation, the network device may indicate the first information and the second information by using the following signaling: a system information block 1 (SIB1), a re-interpreted bit in a random access response uplink grant (RAR UL grant), or downlink control information (DCI) for scheduling Msg2.

The following provides description by using the re-interpreted bit in the RAR UL grant as an example. It should be noted that a manner in which the network device indicates information by using the re-interpreted bit in the RAR UL grant may be separately implemented as a solution. For example, the network device may use the re-interpreted bit in the RAR UL grant to indicate scheduling information such as a redundancy version, a hybrid automatic repeat request process, an antenna port, repeated transmission information, frequency hopping information, and time domain resource allocation.

For example, content of the RAR UL grant may be shown in Table 1.

TABLE 1

| Indicator field | Indication content |
|---|---|
| Frequency hopping flag | Indicating whether the terminal device performs Msg3 frequency hopping transmission |
| Frequency domain resource allocation (FDRA) | Indicating frequency domain resource allocation information. |
| Modulation and coding scheme (MCS) | Indicating an MCS |
| . . . | . . . |

For example, the re-interpreted bits in the RAR UL grant may include at least one of the following: K1 bits in an MCS indicator field, where K1 is a positive integer less than or equal to N, and N is a total quantity of bits in the MCS indicator field; and K2 bits in an FDRA indicator field, where K2 is a positive integer less than or equal to M, and M is a total quantity of bits in the FDRA indicator field.

K1 may be determined based on a maximum value of an MCS of the first signaling, and the maximum value of the MCS is predefined or is configured by the network device. K2 may be determined based on a maximum quantity of frequency domain resources of the first signaling, and the maximum quantity of frequency domain resources is predefined or is configured by the network device.

For example, the K1 bits may be bits other than a bit indicating the MCS in the MCS indicator field. For example, the MCS indicator field includes K1+k1 bits, where k1 bits indicate the MCS, and the remaining K1 bits are re-interpreted bits in the RAR UL grant. The K2 bits may be bits other than a bit indicating the quantity of frequency domain resources in the FDRA indicator field. For example, the FDRA indicator field includes K2+k2 bits, where k2 bits indicate the quantity of frequency domain resources, and the remaining K2 bits are re-interpreted bits in the RAR UL grant.

In a possible implementation, the terminal device may determine, by performing the following steps A1 and A2, a quantity of bits indicating the MCS and/or a quantity of bits indicating the quantity of frequency domain resources. This implementation may alternatively be implemented as a separate solution without depending on step S301 to step S303 and the solution of the re-interpreted bits in the RAR UL grant.

A1: The terminal device receives fifth information from the network device, where the fifth information indicates at least one of the following: a maximum value of an MCS of the terminal device, where the maximum value of the MCS is less than a first value, and the first value is a maximum value of the MCS predefined or configured by the network device; and a maximum quantity of frequency domain resources of the terminal device, where the maximum quantity of frequency domain resources is less than a quantity of frequency domain resources included in a BWP.

For example, the first value is a maximum value of an MCS in an MCS table indicated by the network device. For example, a plurality of MCS tables may be predefined. The network device may indicate, from the plurality of MCS tables, an MCS table used by the terminal device, and the first value is a maximum value of the MCS table.

For example, the fifth information may be a maximum value of the MCS and/or a maximum quantity of frequency domain resources that are/is configured by the network device for the second-type terminal device or another terminal device that needs to enhance transmission performance. Alternatively, the fifth information may be a maximum value of the MCS and/or a maximum quantity of frequency domain resources that are/is configured by the network device for specific communication of the terminal device.

A2: The terminal device may determine sixth information based on the fifth information, where the sixth information includes at least one of the following: the quantity of bits indicating the MCS and/or the quantity of bits indicating the quantity of frequency domain resources.

For example, a quantity of bits determined by the terminal device may be a quantity of bits used in current MCS indication. In other words, the quantity of bits determined by the terminal device may be valid only for the current MCS indication.

In an implementation, the terminal device may determine a quantity of bits in the MCS indicator field and/or a quantity of bits in the FDRA indicator field. The quantity of bits in the MCS indicator field is determined based on the maximum value, and the quantity of bits in the FDRA indicator field is determined based on the maximum quantity of frequency domain resources. In this manner, the quantity of bits in the MCS indicator field may be determined based on the maximum value of the MCS of the terminal device, and the quantity of bits in the FDRA indicator field may be determined based on the maximum quantity of frequency domain resources used by the terminal device for transmission.

In another implementation, the terminal device may determine a quantity of bits that are in the MCS indicator field and that indicate the MCS, and/or a quantity of bits that are in the FDRA indicator field and that indicate the quantity of frequency domain resources. In this manner, the quantity of bits in the MCS indicator field is predefined or is configured by the network device, and the quantity of bits indicating the MCS may be determined based on the maximum value of the MCS of the terminal device. The quantity of bits in the FDRA indicator field is predefined or is configured by the network device, and the quantity of bits indicating the quantity of frequency domain resources may be determined based on a maximum quantity of frequency domain resources of transmission performed by the terminal device.

For example, the quantity of bits that are in the MCS indicator field and that indicate the MCS (or the quantity of bits in the MCS indicator field) may meet the following formula:

$$k1 = \lceil \log_2(X+1) \rceil$$

Herein, k1 is the quantity of bits that are in the MCS indicator field and that indicate the MCS (or the quantity of bits in the MCS indicator field), and X is the maximum value of the MCS of the terminal device. For example, if a high-order bit in the MCS indicator field is not 0, a value of X may be 7. Therefore, k1 may be equal to 3. Currently, for example, a total quantity of bits in the MCS indicator field is 4, and the first value is 9. Therefore, if the maximum value of the MCS of the terminal device is equal to 9, =4 bits are required for indicating the MCS. In other words, all bits in the MCS indicator field indicate the MCS. In this embodiment of this application, the maximum value of the MCS of the terminal device is limited to be less than 9, so that the quantity of bits required for indicating the MCS is reduced, and the MCS indicator field may indicate other information by using a redundant bit. For example, if the maximum value of the MCS of the terminal device is 7, $$\lceil \log_2(7+1) \rceil = 3 \text{ bits}$$

are required for indicating the MCS. Therefore, in the MCS indicator field, 3 bits may indicate the MCS, and the remaining one bit is used as a re-interpreted bit to indicate other information.

The quantity of bits that are in the FDRA indicator field and that indicate the quantity of frequency domain resources (or the quantity of bits in the FDRA indicator field) may meet the following formula:

$$k2 = \left\lceil \log_2\left( Y\left(N_{BWP}^{size} - Y\right) + \frac{Y(Y+1)}{2} \right) \right\rceil$$

Herein, k2 is the quantity of bits that are in the FDRA indicator field and that indicate the quantity of frequency domain resources (or the quantity of bits in the FDRA indicator field), $$N_{BWP}^{size}$$

is the quantity of frequency domain resources included in the BWP, and Y is the maximum quantity of frequency domain resources. For example, $$N_{BWP}^{size} = 273,$$

the maximum quantity Y of frequency domain resources may be 31. Currently, for example, the total quantity of bits in the FDRA indicator field is 14, and $$N_{BWP}^{size} = 273.$$

Therefore, the maximum quantity of frequency domain resources corresponding to transmission performed by the terminal device is equal to 273. In this case, all bits in the FDRA indicator field indicate the quantity of frequency domain resources. In this embodiment of this application, the maximum quantity of frequency domain resources of the terminal device is limited to be less than 273, so that a quantity of bits required for indicating the quantity of frequency domain resources is reduced, and the FDRA indicator field may indicate other information by using a redundant bit. For example, if the maximum quantity of frequency domain resources corresponding to transmission performed by the terminal device is 31, and $$N_{BWP}^{size} = 273, \left\lceil \log_2\left(Y\left(N_{BWP}^{size} - Y\right) + \frac{Y(Y+1)}{2}\right) \right\rceil = 13 \text{ bits}$$

are required for indicating the MCS. Therefore, in the FDRA indicator field, 13 bits may indicate the frequency domain resource allocation information, and the remaining one bit is used as a re-interpreted bit to indicate other information.

Based on the implementation, K1 may meet the following formula:

$$K1 = N - k1 = N - \lceil \log_2(X+1) \rceil$$

For example, $\lceil \log_2 (X+1) \rceil$ bits from a low order to a high order in the MCS indicator field may indicate the MCS, and remaining $N-\lceil \log_2(X+1) \rceil$ bits indicate other information.

K2 may meet the following formula:

$$K2 = M - k2 = M - \left\lceil \log_2\left(Y\left(N_{BWP}^{size} - Y\right) + \frac{Y(Y+1)}{2}\right) \right\rceil$$

For example, $$\left\lceil \log_2\left(Y\left(N_{BWP}^{size} - Y\right) + \frac{Y(Y+1)}{2}\right) \right\rceil \text{ bits}$$

bits from a low order to a high order in the FDRA field may indicate the frequency domain resource allocation information, and remaining $$M - \left\lceil \log_2\left(Y\left(N_{BWP}^{size} - Y\right) + \frac{Y(Y+1)}{2}\right) \right\rceil \text{ bits}$$

indicate other information.

In an embodiment, the K1 bits and the K2 bits may be used for separate indication. For example, the K1 bits may indicate the first information, and the K2 bits indicate the second information. Alternatively, the K1 bits and the K2 bits may be used for joint indication. For example, the K1 bits and the K2 bits may jointly indicate the first information and the second information.

It should be understood that the foregoing example is merely intended to facilitate understanding the solution, and does not specifically limit an indication form.

Optionally, the network device may alternatively indicate the first information and/or the second information by jointly using the re-interpreted bit in the RAR UL grant, DCI used for scheduling an RAR, and the SIB 1. For example, whether to perform repeated transmission and/or frequency hopping transmission may be jointly indicated by using the re-interpreted bit in the RAR UL grant and the DCI used for scheduling the RAR. For another example, whether to perform repeated transmission and/or frequency hopping transmission may be semi-statically configured by using the re-interpreted bit in the RAR UL grant and the SIB 1.

In an implementation, if the terminal device sends the first signaling in the intra-slot frequency hopping and non-repeated transmission manner, the frequency hopping manner may be intra-BWP frequency hopping.

In an implementation, if the terminal device sends the first signaling in the inter-slot frequency hopping and repeated transmission manner, the frequency hopping manner may include inter-BWP frequency hopping and/or intra-BWP frequency hopping. Inter-BWP frequency hopping may mean that frequency domain locations of frequency hopping transmission are located in different BWPs, and intra-BWP frequency hopping may mean that frequency domain locations of frequency hopping transmission are located in a same BWP. It should be noted that for inter-BWP frequency hopping, when BWP switching is performed, radio frequency retuning and the like need to be performed during BWP switching. Therefore, during inter-BWP frequency hopping, there may be an interval of X symbol/slot duration between two adjacent times of transmission. X is related to a capability of the terminal device. In the interval, the terminal device does not receive or send data. However, for intra-BWP frequency hopping, there may be no interval between two adjacent times of transmission. In other words, the two adjacent times of transmission may be consecutive in time domain, to improve transmission efficiency.

Optionally, the network device may indicate, by using second signaling, that a frequency domain frequency hopping mode is inter-BWP frequency hopping or intra-BWP frequency hopping. The second signaling may be indicated by the following signaling: system broadcast information, RRC signaling, a media access control channel element (MAC CE), DCI, or the like. Specifically, if the first signaling is Msg3, the second signaling may include the SIB 1, DCI used for scheduling Msg2, or the re-interpreted bit in the RAR UL grant.

Optionally, the network device may further indicate, by using third information, a frequency hopping location for inter-BWP frequency hopping, and/or indicate, by using fourth information, a frequency hopping location for intra-BWP frequency hopping. For example, the network device may indicate the third information and/or the fourth information in the following two implementations.

Implementation 1: If the frequency domain frequency hopping mode is intra-BWP frequency hopping, the network device may reuse a frequency hopping indication bit in an FDRA indicator field in an existing RAR UL grant to indicate a frequency domain offset of a second time of frequency hopping transmission. In other words, the network device may indicate, by using a frequency hopping flag indicator field in the RAR UL grant, whether the terminal device performs frequency hopping transmission. Several groups of frequency domain offset values of the second-hop transmission may be predefined in the protocol, and indicated by a high-order bit in the FDRA indicator field in the RAR UL grant. Specifically, the frequency domain offset may be a quantity of RBs, and the frequency domain offset may be a predefined value in the conventional technology, or may be a newly introduced value. The newly introduced offset value may be a value predefined in the protocol, or may be configured by the network device, for example, configured by using the following signaling: the SIB 1, the DCI used for scheduling Msg2, and the re-interpreted bit in the RAR UL grant.

If the frequency domain frequency hopping mode is inter-BWP frequency hopping, the network device may pre-configure one or more frequency hopping BWP ID sequences in the SIB 1, and indicate, by using the DCI used for scheduling Msg2 and the re-interpreted bit in the RAR UL grant, which frequency hopping BWP ID sequence is used. For example, the network device may pre-configure four BWPs. When configuring inter-BWP frequency hopping, the network device may configure the BWP ID sequence in a frequency hopping transmission process, for example, (0, 2, 1, 3) or (2, 0, 3, 1). In an implementation, when frequency hopping transmission is performed between different BWPs, relative frequency domain locations in the BWPs for each time of transmission may be the same.

Implementation 2: For inter-BWP frequency hopping and intra-BWP frequency hopping, a frequency domain offset value for a next time of frequency hopping transmission may be predefined or may be configured by the network device. For intra-BWP frequency hopping, the frequency domain offset value may be less than a size of a current BWP. For inter-BWP frequency hopping, the frequency domain offset value may be greater than or equal to the size of the current BWP. For example, the size of the BWP is 51 RBs. For intra-BWP frequency hopping, frequency domain offset values are set to {10, 20, 30}, and for inter-BWP frequency hopping, frequency domain offset values are set to {60, 70, 80}.

For the two implementations, the network device may configure both frequency domain offset values for inter-BWP frequency hopping and frequency domain offset values for intra-BWP frequency hopping, and the terminal device may determine, based on a determined frequency domain frequency hopping mode, a group of frequency domain offset values to be used for frequency hopping transmission. For example, frequency domain offset values configured by the network device include {10, 20, 30, 60, 70, 80}. When the terminal device determines to perform intra-BWP frequency hopping, offset values that may be used are {10, 20, 30}. When the terminal device determines to perform inter-BWP frequency hopping, offset values that may be used are {60, 70, 80}.

Figure 4:
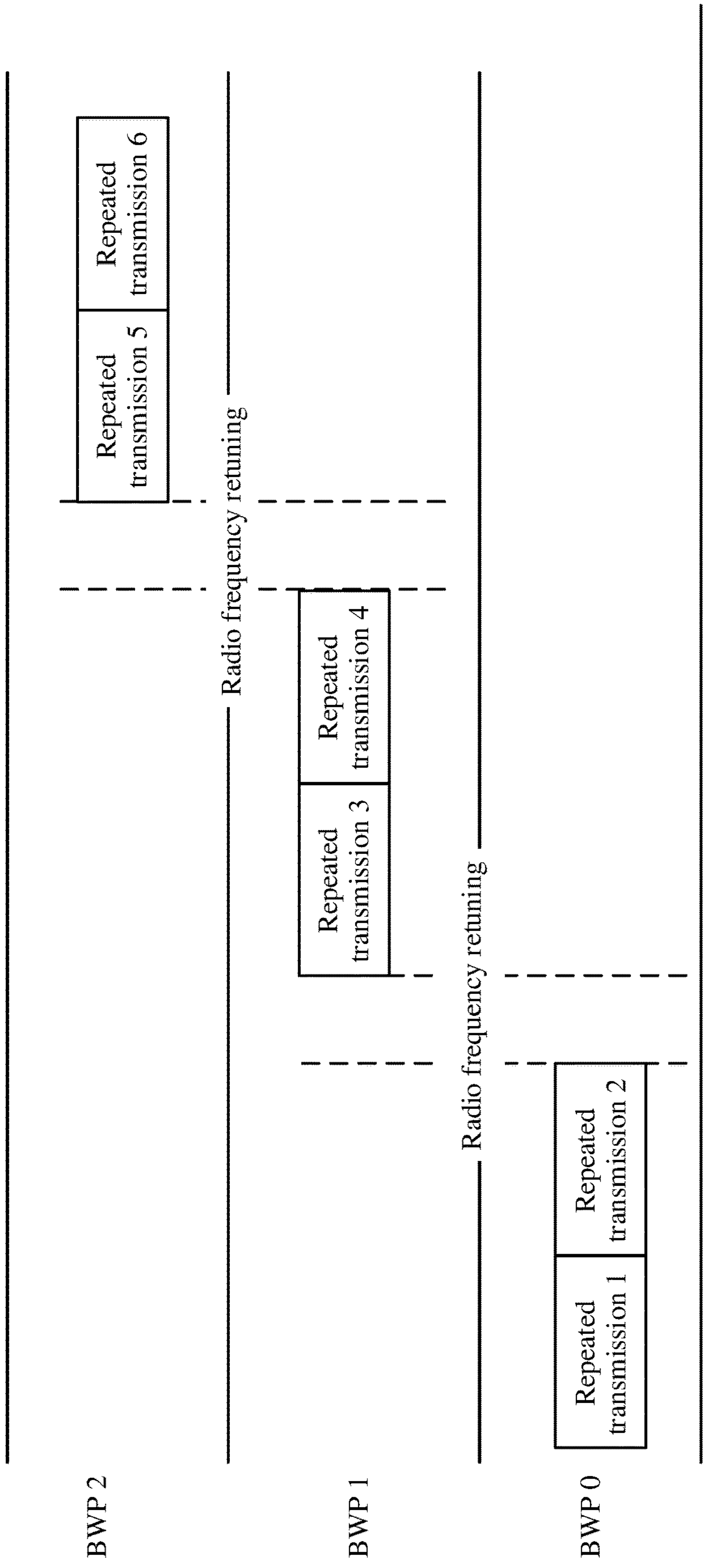
FIG. 4 is a schematic diagram of repeated transmission according to an embodiment of this application.

In a specific example, the network device may configure three BWPs: a BWP 0, a BWP 1, and a BWP 2. The network device may indicate the terminal device to send the Msg3 in the repeated transmission and inter-BWP frequency hopping manner. A quantity of times of repeated transmission is 6, and inter-BWP frequency hopping is performed each time two times of repeated transmission are performed. The BWP ID sequence during inter-BWP frequency hopping is (0, 1, 2). A time-frequency domain location of the six times of transmission is shown in FIG. 4.

The "BWP" in inter-BWP frequency hopping and intra-BWP frequency hopping in this application may be understood as a frequency domain resource block. It should be noted that in this embodiment of this application, an example in which a frequency domain resource is a BWP is merely used for description. Alternatively, the frequency domain resource may be another resource block, and is not limited to a granularity of the BWP. For example, the frequency domain resource may be a frequency domain resource block including consecutive resource blocks (RB).

For example, when frequency hopping is performed between a plurality of BWPs, the plurality of BWPs may have different BWP index values. Alternatively, the plurality of BWPs may have a same index value but at different frequency domain locations or have different start locations. In an example description, if the plurality of BWPs are applied to an initial access phase, for example, the Msg3, a channel such as a PUCCH, or a common PRACH resource used for hybrid automatic repeat request (HARQ)-acknowledgment (ACK) feedback of a fourth message (Msg4), the plurality of BWPs may be initial uplink BWPs.

In an embodiment, the network device may configure a plurality of BWPs for the terminal device. The plurality of BWPs may have different BWP index values. Alternatively, the plurality of BWPs may have a same index value but at different frequency domain locations or have different start locations. For example, the plurality of BWPs are initial uplink BWPs. The network device may configure a plurality of initial uplink BWPs. The plurality of initial uplink BWPs include at least one first initial uplink BWP and at least one second initial uplink BWP. The at least one first initial uplink BWP is configured by the network device for a first-type terminal device, and the at least one second initial uplink BWP is configured by the network device for a second-type terminal device.

For the second-type terminal device, if the second-type terminal device works on the second initial uplink BWP, that is, a current active BWP is the second initial uplink BWP, when the second-type terminal device performs transmission on the second initial uplink BWP, frequency domain resource allocation information of the transmission may be determined in the following three manners:

(1) The information may be determined based on the second initial uplink BWP, and specifically, may be determined based on at least one of a start location of the second initial uplink BWP and a quantity of RBs included in the second initial uplink BWP.

(2) The information may be determined based on the first initial uplink BWP, and specifically, may be determined based on at least one of a start location of the first initial uplink BWP and a quantity of RBs included in the first initial uplink BWP.

(3) The information may be determined based on the first initial uplink BWP and the second initial uplink BWP, and specifically, may be determined based on at least one of a start location of the second initial uplink BWP, a relative location between the second initial uplink BWP and the first initial uplink BWP, and a quantity of RBs included in the first initial uplink BWP.

Extendedly, when a frequency domain resource that is of the transmission and that is determined by the terminal device is within a range of the second initial uplink BWP, radio frequency link adjustment may not be performed; or when a frequency domain resource that is of data transmission and that is determined by the terminal device is outside a range of the second initial uplink BWP, radio frequency link adjustment may be performed.

It should be noted that the manners of configuring the BWP may not depend on the step S301 to the step S303, and may be separately implemented as a solution. Optionally, for the second-type terminal device, regardless of an initial access phase or a post-initial access phase, a carrier bandwidth configured by the network device may be allowed to be greater than a maximum bandwidth of UE. Specifically, there may be the following two implementations:

(1) The network device separately configures the carrier bandwidth in the initial access phase and the post-initial access phase, where the carrier bandwidth is allowed to be greater than the maximum bandwidth of UE.

(2) The network device configures the carrier bandwidth in the initial access phase, where the carrier bandwidth is allowed to be greater than the maximum bandwidth of the UE, and the carrier bandwidth configured in the initial access phase is continuously used in the post-initial access phase.

In another implementation, the second-type terminal may report a bandwidth capability greater than a maximum bandwidth supported by the second-type terminal. The network device configures a carrier bandwidth for the second-type terminal based on the bandwidth capability.

It should be noted that the manners of configuring the carrier bandwidth may not depend on the step S301 to the step S303, and may be separately implemented as a solution.

In a possible implementation, when the terminal device sends first signaling in an inter-slot frequency hopping and repeated transmission manner, the first signaling may be sent in the following manner: repeatedly sending the first signaling in an inter-slot frequency hopping manner each time P times of repeated transmission are performed, where Pis a positive integer. In other words, after repeatedly sending the first signaling for P times, the terminal device repeatedly sends the first signaling in the inter-slot frequency hopping manner. For example, a value of P may be configured by the network device, for example, indicated by using the following signaling: a SIB 1, the re-interpreted bit in the RAR UL grant, the DCI for scheduling Msg2, or the like. Alternatively, a value of P may be predefined. For example, P may be determined based on the quantity of times of repeated transmission. In the foregoing manner, both a frequency hopping gain and a time-domain joint channel estimation gain can be obtained, to further improve communication performance.

Figure 5:
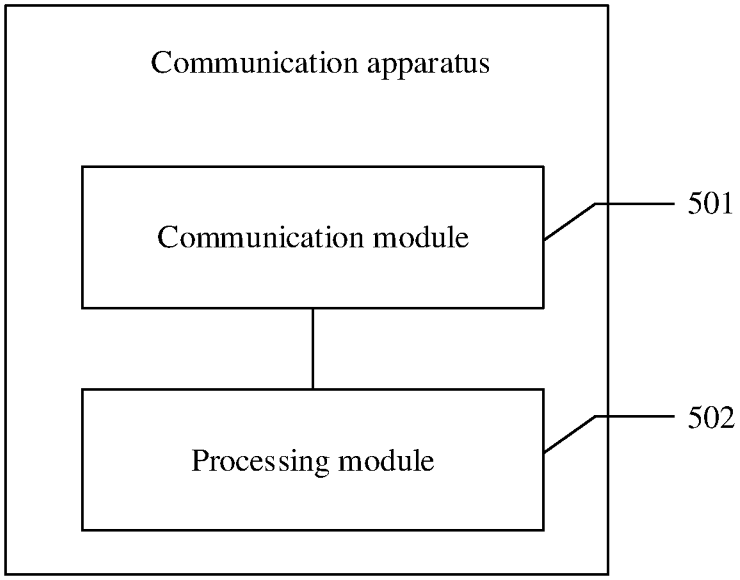
FIG. 5 is a schematic diagram of a structure of a communication apparatus according to an embodiment of this application.

Based on a same concept as the method embodiments, an embodiment of this application provides a communication apparatus. A structure of the communication apparatus may be shown in FIG. 5. The communication apparatus includes a communication module 501 and a processing module 502.

In a specific implementation, the communication apparatus may be specifically configured to implement the method performed by the terminal device in embodiments shown in FIG. 3 and FIG. 4. The apparatus may be the terminal device, or may be a chip, a chip set, or a part of a chip, where the chip and the chip set are in the terminal device, and the part of the chip is configured to perform a function of a related method. The communication module 501 is configured to communicate with a network device. The processing module 502 is configured to: determine to perform transmission in a frequency hopping transmission manner; and when transmission is performed in a repeated transmission manner, transmit first signaling through the communication module 501 in an inter-slot frequency hopping and repeated transmission manner; and/or when transmission is performed in a non-repeated transmission manner, transmit the first signaling through the communication module 501 in an intra-slot frequency hopping and non-repeated transmission manner.

Optionally, the processing module 502 is further configured to determine, based on first information or a predefined rule, whether to perform transmission in the repeated transmission manner.

Optionally, the processing module 502 is further configured to determine, based on second information or a predefined rule, to perform transmission in the frequency hopping transmission manner.

In an implementation, when transmitting the first signaling through the communication module 501 in the inter-slot frequency hopping and repeated transmission manner, the processing module 502 is specifically configured to: repeatedly transmit the first signaling through the communication module 501 in an inter-slot frequency hopping manner each time P times of repeated transmission are performed, where P is a positive integer.

In another implementation, when transmitting the first signaling in the intra-slot frequency hopping and non-repeated transmission manner, the processing module 502 is specifically configured to transmit the first signaling through the communication module 501 in an intra-slot frequency hopping and intra-BWP frequency hopping manner.

Optionally, the communication module 501 is further configured to receive a random access response from the network device, where an uplink grant in the random access response indicates at least one of the following: first information, second information, third information, and fourth information; and the third information indicates a frequency hopping location for inter-BWP frequency hopping, and the fourth information indicates a frequency hopping location for intra-BWP frequency hopping.

In another specific implementation, the communication apparatus may be specifically configured to implement the method performed by the network device in embodiments in FIG. 3 and FIG. 4. The apparatus may be the network device, or may be a chip, a chip set, or a part of a chip, where the chip and the chip set are in the network device, and the part of the chip is configured to perform a function of a related method. The communication module 501 is configured to communicate with a terminal device. The processing module 502 is configured to: determine to perform transmission in a frequency hopping transmission manner; and when transmission is performed in a repeated transmission manner, transmit first signaling through the communication module 501 in an inter-slot frequency hopping and repeated transmission manner; and/or when transmission is performed in a non-repeated transmission manner, transmit the first signaling through the communication module 501 in an intra-slot frequency hopping and non-repeated transmission manner.

Optionally, the processing module 502 is further configured to determine, based on a predefined rule, whether to perform transmission in the repeated transmission manner.

Optionally, the processing module 502 is further configured to determine, based on a predefined rule, to perform transmission in the frequency hopping transmission manner.

In an implementation, when transmitting the first signaling through the communication module 501 in the inter-slot frequency hopping and repeated transmission manner, the processing module 502 is specifically configured to: repeatedly transmit the first signaling through the communication module 501 in an inter-slot frequency hopping manner each time P times of repeated transmission are performed, where P is a positive integer.

In another implementation, when transmitting the first signaling through the communication module 501 in the intra-slot frequency hopping and non-repeated transmission manner, the processing module 502 is specifically configured to transmit the first signaling through the communication module 501 in an intra-slot frequency hopping and intra-BWP frequency hopping manner.

Optionally, the communication module 501 is further configured to: send a random access response, where an uplink grant in the random access response indicates at least one of the following: first information, second information, third information, and fourth information; and the first information indicates whether to perform transmission in the repeated transmission manner, the second information indicates to perform transmission in the frequency hopping transmission manner, the third information indicates a frequency hopping location for inter-BWP frequency hopping, and the fourth information indicates a frequency hopping location for intra-BWP frequency hopping.

In a specific implementation, the communication apparatus may be specifically configured to implement the method performed by the terminal device in the solution in which information is indicated by using the re-interpreted bit in the RAR UL grant in embodiments in FIG. 3 and FIG. 4. The apparatus may be the terminal device, or may be a chip, a chip set, or a part of a chip, where the chip and the chip set are in the terminal device, and the part of the chip is configured to perform a function of a related method. The communication module 501 is configured to receive fifth information from the network device, where the fifth information indicates at least one of the following: a maximum value of an MCS of the terminal device, where the maximum value of the MCS is less than a first value, and the first value is a maximum value of the MCS predefined or configured by the network device; and a maximum quantity of frequency domain resources corresponding to transmission performed by the terminal device, where the maximum quantity of frequency domain resources is less than a quantity of frequency domain resources included in a BWP. The processing module 502 is configured to determine sixth information based on the fifth information, where the sixth information includes at least one of the following: a quantity of bits indicating the MCS and a quantity of bits indicating the quantity of frequency domain resources.

Optionally, the processing module 502 is specifically configured to determine a quantity of bits in an MCS indicator field and/or a quantity of bits in an FDRA indicator field, where the quantity of bits in the MCS indicator field is determined based on the maximum value of the MCS of the terminal device, and the quantity of bits in the FDRA indicator field is determined based on the maximum quantity of frequency domain resources.

Alternatively, the processing module 502 is specifically configured to determine a quantity of bits that are in the MCS indicator field and that indicate the MCS, and/or a quantity of bits that are in the FDRA indicator field and that indicate the quantity of frequency domain resources.

In another specific implementation, the communication apparatus may be specifically configured to implement the method performed by the network device in the solution in which information is indicated by using the re-interpreted bit in the RAR UL grant in embodiments in FIG. 3 and FIG. 4. The apparatus may be the network device, or may be a chip, a chip set, or a part of a chip, where the chip and the chip set are in the network device, and the part of the chip is configured to perform a function of a related method. The communication module 501 and the processing module 502 are configured to determine fifth information, where the fifth information indicates at least one of the following: a maximum value of an MCS of the terminal device, where the maximum value of the MCS is less than a first value, and the first value is a maximum value of the MCS predefined or configured by the network device; and a maximum quantity of frequency domain resources corresponding to transmission performed by the terminal device, where the maximum quantity of frequency domain resources is less than a quantity of frequency domain resources included in a BWP. The communication module 501 is configured to send the fifth information.

Division into the modules in embodiments of this application is an example, is merely division into logical functions, and may be other division during actual implementation. In addition, functional modules in embodiments of this application may be integrated into one processor, or each of the modules may exist alone physically, or two or more modules may be integrated into one module. The integrated module may be implemented in a form of hardware, or may be implemented in a form of a software functional module. It may be understood that for functions or implementations of the modules in embodiments of this application, further refer to related description in the method embodiments.

Figure 6:
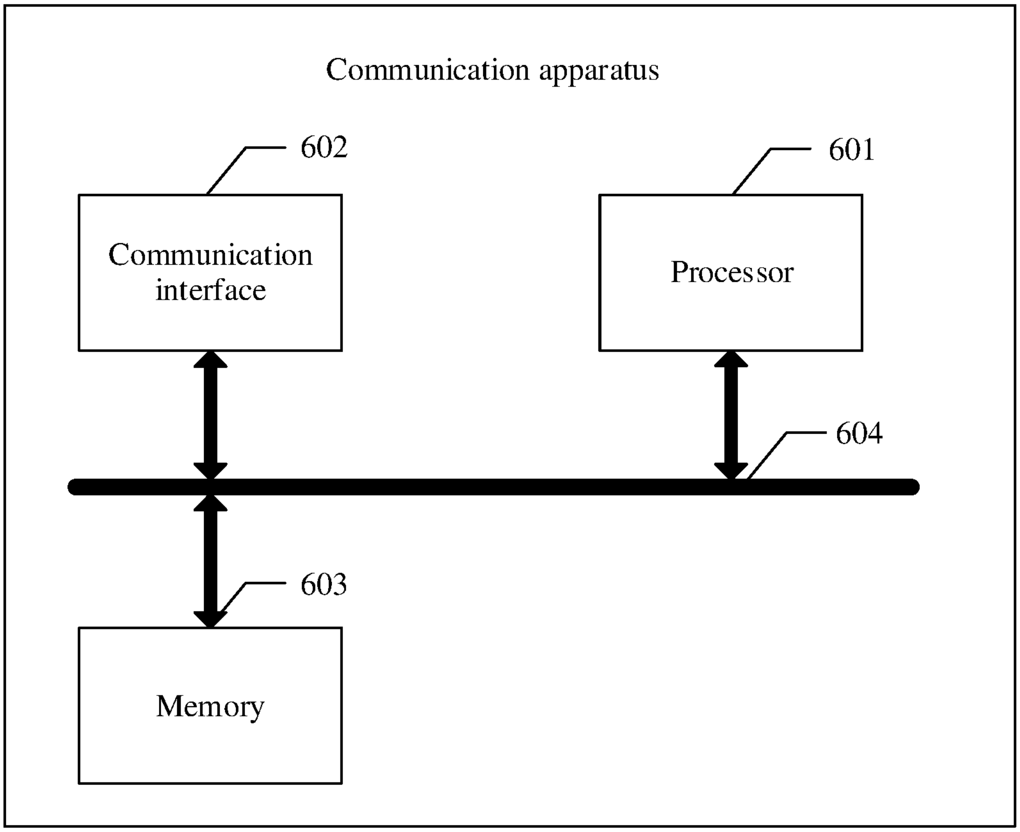
FIG. 6 is a schematic diagram of a structure of a communication apparatus according to an embodiment of this application.

In a possible implementation, the communication apparatus may be shown in FIG. 6. The apparatus may be a communication device or a chip in the communication device. The communication device may be the terminal device in the foregoing embodiment or the network device in the foregoing embodiment. The apparatus includes a processor 601 and a communication interface 602, and may further include a memory 603. The processing module 502 may be the processor 601. The communication module 501 may be the communication interface 602.

The processor 601 may be a CPU, a digital processing unit, or the like. The communication interface 602 may be a transceiver, an interface circuit such as a transceiver circuit, a transceiver chip, or the like. The apparatus further includes a memory 603, configured to store a program executed by the processor 601. The memory 603 may be a nonvolatile memory, for example, a hard disk drive (HDD) or a solid-state drive (SSD), or may be a volatile memory, for example, a random access memory (RAM). The memory 603 is any other medium that can be used to carry or store expected program code in a form of an instruction or a data structure and that can be accessed by a computer, but is not limited thereto.

The processor 601 is configured to execute the program code stored in the memory 603, and is specifically configured to perform an action of the processing module 502. Details are not described herein again in this application. The communication interface 602 is specifically configured to perform an action of the communication module 501. Details are not described in this application again.

A specific connection medium between the communication interface 602, the processor 601, and the memory 603 is not limited in this embodiment of this application. In this embodiment of this application, the memory 603, the processor 601, and the communication interface 602 are connected to each other by using a bus 604 in FIG. 6. The bus is represented by using a thick line in FIG. 6. This is merely an example for description, and is not used as a limitation. Another component connection manner may be alternatively used. Buses may be classified into an address bus, a data bus, a control bus, and the like. For ease of indication, the bus is indicated by using only one bold line in FIG. 6. However, it does not indicate that there is only one bus or only one type of bus.

Figure 7:
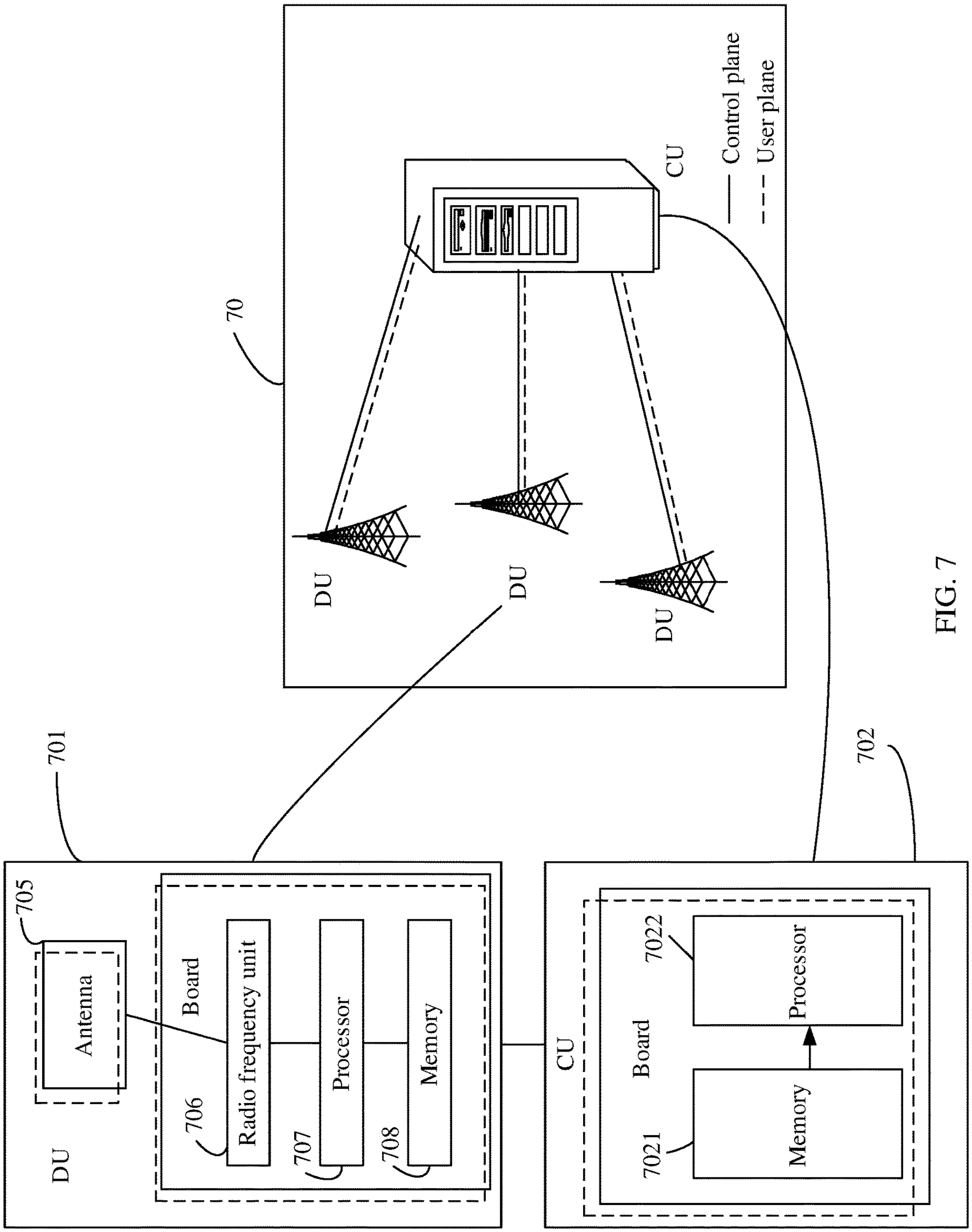
FIG. 7 is a schematic diagram of a structure of a network device according to an embodiment of this application.

FIG. 7 is a schematic diagram of a structure of a network device according to an embodiment of this application, for example, may be a schematic diagram of a structure of a network device. The network device may be applied to the system shown in FIG. 1, to perform a function of the network device in the method embodiments in FIG. 3 and FIG. 4. A network device 70 may include one or more distributed units (DUs) 701 and one or more central units (CU) 702. The DU 701 may include at least one antenna 705, at least one radio frequency unit 706, at least one processor 707, and at least one memory 708. The DU 701 is mainly configured to receive and send a radio frequency signal, convert a radio frequency signal and a baseband signal, and perform some baseband processing. The CU 702 may include at least one processor 7022 and at least one memory 7021. The CU 702 and the DU 701 may communicate with each other through an interface. A control plane interface may be Fs-C, for example, F1-C. A user plane interface may be Fs-U, for example, F1-U.

The CU 702 is mainly configured to: perform baseband processing, control the network device, and the like. The DU 701 and the CU 702 may be physically disposed together, or may be physically disposed separately, in other words, may be a distributed base station. The CU 702 is a control center of the network device, may also be referred to as a processing unit, and is mainly configured to complete a baseband processing function. For example, the CU 702 may be configured to control the network device to perform an operation procedure related to the network device in the method embodiments in FIG. 3 and FIG. 4.

Specifically, baseband processing on the CU and the DU may be divided based on protocol layers of a radio network. For example, functions of a packet data convergence protocol (PDCP) layer and a protocol layer above the PDCP layer are set in the CU. Functions of protocol layers below the PDCP layer, such as a radio link control (RLC) layer and a media access control (MAC) layer, are set in the DU. For another example, the CU implements functions of an RRC layer and the PDCP layer, for example, a receiving and sending action in this embodiment of this application, and the DU implements functions of the RLC layer, the MAC layer, and a physical (PHY) layer, for example, an action of determining a transmission manner in this embodiment of this application.

In addition, optionally, the network device 70 may include one or more radio frequency units (RUS), one or more DUs, and one or more CUs. The DU may include at least one processor 707 and at least one memory 708, the DU may include at least one antenna 705 and at least one radio frequency unit 706, and the CU may include at least one processor 7022 and at least one memory 7021.

In an example, the CU 702 may include one or more boards, and a plurality of boards may jointly support a radio access network (for example, a 5G network, or a 6G network) of a single access standard, or may separately support radio access networks (such as an LTE network, a 5G network, a 6G network, and another network) of different access standards. The memory 7021 and the processor 7022 may serve one or more boards. In other words, a memory and a processor may be disposed on each board. Alternatively, the plurality of boards may share a same memory and a same processor. In addition, a necessary circuit may further be disposed on each board. The DU 701 may include one or more boards, and a plurality of boards may jointly support a radio access network (for example, a 5G network, or a 6G network) of a single access standard, or may separately support radio access networks (such as an LTE network, a 5G network, a 6G network, and another network) of different access standards. The memory 708 and the processor 707 may serve one or more boards. In other words, a memory and a processor may be disposed on each board. Alternatively, a plurality of boards may share a same memory and a same processor. In addition, a necessary circuit may further be disposed on each board.

Figure 8:
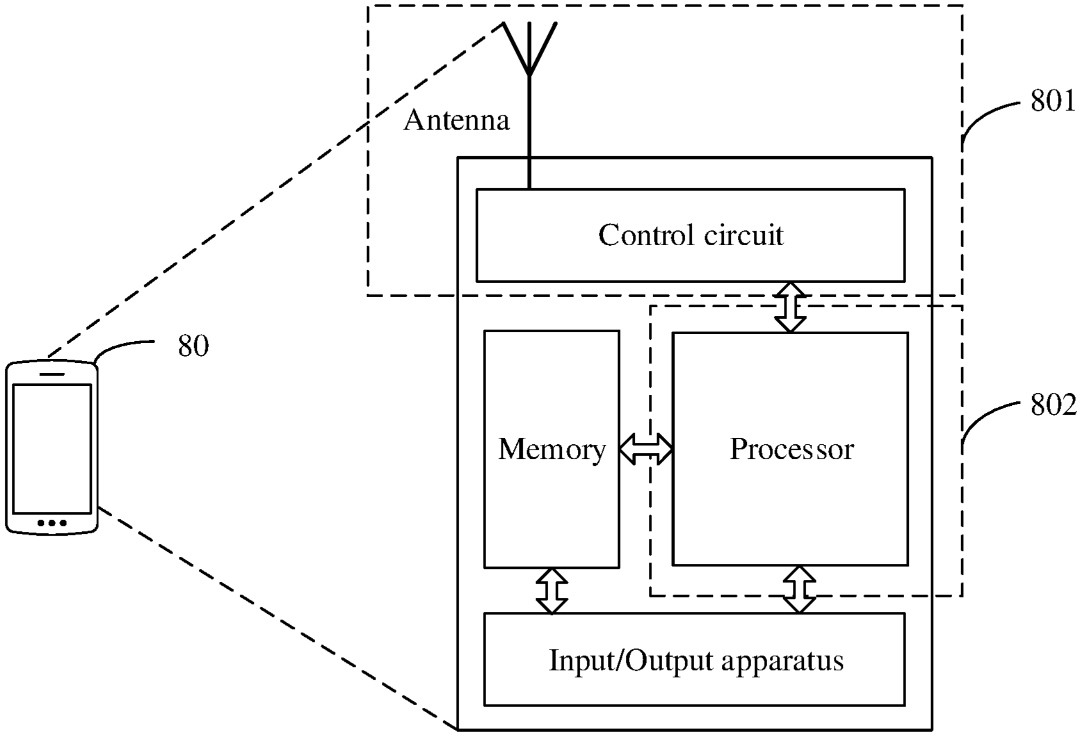
FIG. 8 is a schematic diagram of a structure of a terminal device according to an embodiment of this application.

FIG. 8 is a schematic diagram of a structure of a terminal device according to an embodiment of this application. The terminal device is applicable to the system shown in FIG. 1, and perform a function of the terminal device in the method embodiments in FIG. 3 and FIG. 4. For ease of description, FIG. 8 shows only main components of the terminal device. As shown in FIG. 8, a terminal device 80 includes a processor, a memory, a control circuit, an antenna, and an input/output apparatus. The processor is mainly configured to: process a communication protocol and communication data, control the entire terminal device, execute a software program, and process data of the software program, for example, configured to support the terminal device in performing actions described in the method embodiment in FIG. 3 and FIG. 4. The memory is mainly configured to store the software program and data. The control circuit is mainly configured to: convert a baseband signal and a radio frequency signal and process the radio frequency signal. The control circuit and the antenna together may also be referred to as a transceiver, and are mainly configured to receive and send a radio frequency signal in a form of an electromagnetic wave. The input/output apparatus, such as a touchscreen, a display, or a keyboard, is mainly configured to: receive data input by a user and output data to the user.

After the terminal device is powered on, the processor may read the software program in the memory, explain and execute instructions of the software program, and process the data of the software program. When data needs to be sent wirelessly, the processor performs baseband processing on to-be-sent data, and then outputs a baseband signal to a radio frequency circuit. The radio frequency circuit performs radio frequency processing on the baseband signal, and then sends, by using the antenna, a radio frequency signal in an electromagnetic wave form. When data is sent to the terminal device, the radio frequency circuit receives the radio frequency signal through the antenna, converts the radio frequency signal into a baseband signal, and outputs the baseband signal to the processor. The processor converts the baseband signal into data, and processes the data.

A person skilled in the art may understand that for ease of description, FIG. 8 shows only one memory and one processor. In an actual terminal device, there may be a plurality of processors and a plurality of memories. The memory may also be referred to as a storage medium, a storage device, or the like. The memory may be a storage element located on a same chip as the processor, namely, an on-chip storage element, or may be an independent storage element. This is not limited in this embodiment of this application.

In an optional implementation, the terminal device may include a baseband processor and a central processing unit. The baseband processor is mainly configured to process the communication protocol and the communication data. The central processing unit is mainly configured to: control the entire terminal device, execute the software program, and process the data of the software program. Functions of the baseband processor and the central processing unit may be integrated into the processor in FIG. 8. A person skilled in the art may understand that the baseband processor and the central processing unit each may be an independent processor, and are interconnected by using a technology such as a bus. A person skilled in the art may understand that the terminal device may include a plurality of baseband processors to adapt to different network standards, and the terminal device may include a plurality of central processing units, to enhance processing capabilities of the terminal device, and components of the terminal device may be connected by using various buses. The baseband processor may also be expressed as a baseband processing circuit or a baseband processing chip. The central processing unit may alternatively be expressed as a central processing circuit or a central processing chip. The function of processing the communication protocol and the communication data may be built in the processor, or may be stored in the memory in a form of a software program, and the processor executes the software program, to implement a baseband processing function.

In this embodiment of this application, the antenna having a transceiver function and the control circuit may be considered as a transceiver unit 801 of the terminal device 80, for example, configured to support the terminal device in performing a receiving function and a sending function. A processor 802 having a processing function is considered as a processing unit 802 of the terminal device 80. As shown in FIG. 8, the terminal device 80 includes the transceiver unit 801 and the processing unit 802. The transceiver unit may also be referred to as a transceiver machine, a transceiver, a transceiver apparatus, or the like. Optionally, a component configured to implement a receiving function in the transceiver unit 801 may be considered as a receiving unit. A component configured to implement the sending function in the transceiver unit 801 may be considered as a sending unit. In other words, the transceiver unit 801 includes the receiving unit and the sending unit. The receiving unit may also be referred to as a receiver, an input port, a receiving circuit, or the like. The sending unit may be referred to as a transmitting machine, a transmitter, a transmitting circuit, or the like.

The processor 802 may be configured to execute instructions stored in the memory, to control the transceiver unit 801 to receive a signal and/or send a signal, to complete the function of the terminal device in the method embodiments. The processor 802 further includes an interface, configured to implement a signal input/output function. In an implementation, a function of the transceiver unit 801 may be implemented by using a transceiver circuit or a transceiver-dedicated chip.

An embodiment of this application further provides a computer-readable storage medium, configured to store computer software instructions that need to be executed by the processor, and the computer software instructions include a program that needs to be executed by the processor.

An embodiment of this application further provides a communication system, including a communication apparatus configured to implement functions of the terminal device in embodiments in FIG. 3 and FIG. 4 and a communication apparatus configured to implement functions of the network device in embodiments in FIG. 3 and FIG. 4.

A person skilled in the art should understand that embodiments of this application may be provided as a method, a system, or a computer program product. Therefore, this application may use a form of hardware only embodiments, software only embodiments, or embodiments with a combination of software and hardware. In addition, this application may use a form of a computer program product that is implemented on one or more computer-usable storage media (including but not limited to a disk memory, a CD-ROM, an optical memory, and the like) that include computer-usable program code.

What is claimed is:

1. A communication method applied to a terminal device, the method comprising:

determining to perform transmission in a frequency hopping transmission manner, wherein the frequency hopping transmission manner comprises inter-bandwidth part (inter-BWP) frequency hopping and/or intra-BWP frequency hopping, wherein the inter-BWP frequency hopping utilizes frequency domains located in different BWPs, and wherein the intra-BWP frequency hopping utilizes frequency domains located in a same BWP;

determining, based on first information or a predefined rule, whether to perform the transmission in a repeated transmission manner or a non-repeated transmission manner;

based on the transmission being performed in the repeated transmission manner, sending first signaling in an inter-slot frequency hopping and repeated transmission manner; and based on the transmission being performed in the non-repeated transmission manner, sending the first signaling in an intra-slot, intra-BWP frequency hopping and non-repeated transmission manner.

2. The method according to claim 1, wherein the determining to perform the transmission in the frequency hopping transmission manner is based on second information or a second predefined rule.

3. The method according to claim 2, further comprising:

receiving a random access response from a network device, wherein an uplink grant in the random access response indicates at least one of the following: the first information, the second information, third information, and fourth information; and wherein the third information indicates a frequency hopping location for inter-BWP frequency hopping, and the fourth information indicates a frequency hopping location for intra-BWP frequency hopping.

4. The method according to claim 3, wherein an uplink frequency hopping indicator bit comprised in the uplink grant indicates the third information and/or the fourth information.

5. The method according to claim 3, wherein the uplink grant indicates at least one of the first information, the second information, the third information, and the fourth information through one or more of the following:

K1 bits in a modulation and coding scheme (MCS) indicator field, wherein K1 is a positive integer less than or equal to N, and N is a total quantity of bits in the MCS indicator field; and K2 bits in a frequency domain resource allocation (FDRA) indicator field, wherein K2 is a positive integer less than or equal to M, and M is a total quantity of bits in the FDRA indicator field.

6. The method according to claim 5, wherein K1 is determined based on a maximum value of an MCS of the first signaling, and the maximum value of the MCS is predefined or is configured by the network device; and/or K2 is determined based on a maximum quantity of frequency domain resources of the first signaling, and the maximum quantity of frequency domain resources is predefined or is configured by the network device.

7. The method according to claim 1, wherein the sending the first signaling in the inter-slot frequency hopping and repeated transmission manner comprises:

repeatedly sending the first signaling in an inter-slot frequency hopping manner each time that P times of repeated transmission are performed, wherein P is a positive integer.

8. The method according to claim 1, wherein the sending the first signaling in the intra-slot frequency hopping and non-repeated transmission manner comprises:

sending the first signaling in an intra-slot frequency hopping and intra-bandwidth part (BWP) frequency hopping manner.

9. The method according to claim 1, wherein the first signaling is a third message (Msg3) in a random access procedure or a message A (MsgA) in the random access procedure.

10. A communication method applied to a network device, the method comprising:

determining to perform transmission in a frequency hopping transmission manner, wherein the frequency hopping transmission manner comprises inter-bandwidth part (inter-BWP) frequency hopping and/or intra-BWP frequency hopping, wherein the inter-BWP frequency hopping utilizes frequency domains located in different BWPs, and wherein the intra-BWP frequency hopping utilizes frequency domains located in a same BWP;

determining, based on first information or a predefined rule, whether to perform the transmission in a repeated transmission manner or a non-repeated transmission manner;

based on the transmission being performed in the repeated transmission manner, receiving first signaling in an inter-slot frequency hopping and repeated transmission manner; and based on the transmission being performed in the non-repeated transmission manner, receiving the first signaling in an intra-slot, intra-BWP frequency hopping and non-repeated transmission manner.

11. The method according to claim 10, wherein the determining to perform the transmission in the frequency hopping transmission manner is based on a second predefined rule.

12. The method according to claim 11, further comprising comprise:

sending a random access response, wherein an uplink grant in the random access response indicates at least one of the following: first information, second information, third information, and fourth information, wherein the first information indicates whether to perform transmission in the repeated transmission manner, the second information indicates to perform transmission in the frequency hopping transmission manner, the third information indicates a frequency hopping location for inter-BWP frequency hopping, and the fourth information indicates a frequency hopping location for intra-BWP frequency hopping.

13. The method according to claim 12, wherein an uplink frequency hopping indicator bit comprised in the uplink grant indicates the third information and/or the fourth information.

14. The method according to claim 12, wherein the uplink grant indicates at least one of the first information, the second information, the third information, and the fourth information through one or more of the following:

K1 bits in a modulation and coding scheme (MCS) indicator field, wherein K1 is a positive integer less than or equal to N, and N is a total quantity of bits in the MCS indicator field; and K2 bits in a frequency domain resource allocation (FDRA) indicator field, wherein K2 is a positive integer less than or equal to M, and M is a total quantity of bits in the FDRA indicator field.

15. The method according to claim 10, wherein the receiving the first signaling in the inter-slot frequency hopping and repeated transmission manner comprises:

repeatedly receiving the first signaling in an inter-slot frequency hopping manner each time that P times of repeated transmission are performed, wherein P is a positive integer.

16. The method according to claim 10, wherein the receiving the first signaling in the intra-slot frequency hopping and non-repeated transmission manner comprises:

receiving the first signaling in an intra-slot frequency hopping and intra-bandwidth part (BWP) frequency hopping manner.

17. An apparatus, comprising:

one or more processors; and one or more memories coupled to the one or more processors and storing programming instructions for execution by the one or more processors to cause the apparatus to perform a method comprising:

determining to perform transmission in a frequency hopping transmission manner, wherein the frequency hopping transmission manner comprises inter-bandwidth part (inter-BWP) frequency hopping and/or intra-BWP frequency hopping, wherein the inter-BWP frequency hopping utilizes frequency domains located in different BWPs, and wherein the intra-BWP frequency hopping utilizes frequency domains located in a same BWP;

determining, based on first information or a predefined rule, whether to perform the transmission in a repeated transmission manner or a non-repeated transmission manner; and based on the transmission being performed in the repeated transmission manner, sending first signaling in an inter-slot frequency hopping and repeated transmission manner; and based on the transmission being performed in the non-repeated transmission manner, sending the first signaling in an intra-slot, intra-BWP frequency hopping and non-repeated transmission manner.

18. The apparatus according to claim 17, wherein the determining to perform the transmission in the frequency hopping transmission manner is based on second information or a second predefined rule.

19. A communication method applied to a terminal device, the method comprising:

receiving a random access response from a network device, wherein an uplink grant in the random access response indicates at least one of: first information, second information, third information, or fourth information;

determining, based on the first information or a first predefined rule, to perform transmission in a frequency hopping transmission manner;

determining, based on the second information or a second predefined rule, whether to perform the transmission in a repeated transmission manner or a non-repeated transmission manner; and based on the transmission being performed in the repeated transmission manner, sending first signaling in an inter-slot frequency hopping and repeated transmission manner; or based on the transmission being performed in the non-repeated transmission manner, sending the first signaling in an intra-slot frequency hopping and non-repeated transmission manner, wherein the third information indicates a frequency hopping location for inter-BWP frequency hopping, and the fourth information indicates a frequency hopping location for intra-BWP frequency hopping.

20. A communication method, wherein the method is applied to a network device, and the method comprises:

sending a random access response, wherein an uplink grant in the random access response indicates at least one of: first information, second information, third information, or fourth information;

determining, based on the first information or a first predefined rule, to perform transmission in a frequency hopping transmission manner; and determining, based on the second information or a second predefined rule, whether to perform the transmission in a repeated transmission manner; and based on the transmission being performed in the repeated transmission manner, receiving first signaling in an inter-slot frequency hopping and repeated transmission manner; or based on the transmission being performed in the non-repeated transmission manner, receiving the first signaling in an intra-slot frequency hopping and non-repeated transmission manner, wherein the third information indicates a frequency hopping location for inter-BWP frequency hopping, and the fourth information indicates a frequency hopping location for intra-BWP frequency hopping.

* * * * *